United States Patent
Abouelsoud et al.

(10) Patent No.: US 12,502,535 B2
(45) Date of Patent: Dec. 23, 2025

(54) TRANSCRANIAL ELECTRICAL STIMULATION USING POLY-MODULATED WAVEFORMS

(71) Applicants: Mohammed Abouelsoud, Mayfield Heights, OH (US); David J. Mishelevich, Playa Del Rey (CA)

(72) Inventors: Mohammed Abouelsoud, Mayfield Heights, OH (US); David J. Mishelevich, Playa Del Rey (CA)

(73) Assignee: U LLC, Mayfield Heights, OH (US)

( * ) Notice: Subject to any disclaimer, the term of this patent is extended or adjusted under 35 U.S.C. 154(b) by 0 days.

(21) Appl. No.: 19/002,672

(22) Filed: Dec. 26, 2024

(65) Prior Publication Data
US 2025/0213863 A1    Jul. 3, 2025

Related U.S. Application Data

(60) Provisional application No. 63/615,771, filed on Dec. 28, 2023.

(51) Int. Cl.
*A61N 1/36* (2006.01)
*A61N 1/02* (2006.01)
*A61N 1/04* (2006.01)

(52) U.S. Cl.
CPC ......... *A61N 1/36025* (2013.01); *A61N 1/025* (2013.01); *A61N 1/0456* (2013.01); *A61N 1/36031* (2017.08); *A61N 1/36034* (2017.08)

(58) Field of Classification Search
CPC .. A61N 1/36025; A61N 1/025; A61N 1/0456; A61N 1/36031; A61N 1/36034
See application file for complete search history.

(56) References Cited

U.S. PATENT DOCUMENTS

| | | |
|---|---|---|
| 6,934,580 B1 * | 8/2005 | Osorio ................ A61B 5/4094 607/45 |
| 9,440,070 B2 | 9/2016 | Goldwasser et al. |

(Continued)

OTHER PUBLICATIONS

Nitsche, M. A., & Paulus, W. (2000). Excitability changes induced in the human motor cortex by weak transcranial direct current stimulation. The Journal of Physiology, 527(3), 633-639, Wiley-Blackwell, United Kingdom.

(Continued)

*Primary Examiner* — James M Kish
*Assistant Examiner* — Natasha Patel

(57) ABSTRACT

The patent application describes an adaptable neuromodulation device for transcranial electrical brain stimulation. The system can generate complex poly-modulated waveforms by combining multiple pulse parameters in a randomized manner across dimensions like amplitude, frequency, phase, timing, and polarity. It leverages both digital and analog modulation techniques for waveform versatility. The device features pathway optimization algorithms that tune stimulation using neural feedback data to target specific brain region shapes with greater precision. It also enables closed-loop operation for responsiveness to physiological changes. The application details the mathematical and computational foundations, spanning graph theory to generate digital twins. It highlights applications from cognitive enhancement to seizure control. Overall, the innovation promises versatility and precision in non-invasive neuromodulation through adaptable, optimized waveforms grounded in sophisticated modeling.

20 Claims, 4 Drawing Sheets

(56) References Cited

U.S. PATENT DOCUMENTS

| | | | |
|---|---|---|---|
| 11,033,731 B2 | 6/2021 | Jeffery et al. | |
| 2007/0067003 A1* | 3/2007 | Sanchez | A61N 1/36082 607/45 |
| 2015/0066104 A1* | 3/2015 | Wingeier | A61B 5/4836 607/45 |
| 2015/0174418 A1* | 6/2015 | Tyler | A61N 7/00 607/45 |
| 2019/0030336 A1 | 1/2019 | Kwan | |
| 2021/0101007 A1* | 4/2021 | Hamner | A61N 1/36007 |
| 2022/0023616 A1* | 1/2022 | Claude | A61M 21/00 |

OTHER PUBLICATIONS

Terney, D., Chaieb, L., Moliadze, V., Antal, A., & Paulus, W. (2008). Increasing human brain excitability by transcranial high-frequency random noise stimulation. The Journal of Neuroscience, 28(52), 14147-14155, Society for Neuroscience, United States.

Li, Z., Zhang, J., Peterchev, A. V., & Goetz, S. M. (2022). Modular Pulse Synthesizer for Transcranial Magnetic Stimulation with Flexible User-Defined Pulse Shaping and Rapidly Changing Pulses in Sequences. arXiv preprint arXiv:2202.06530. 32 pages, arXiv (Cornell University), New York.

Wexler, A. (2016). The practices of do-it-yourself brain stimulation: implications for ethical considerations and regulatory proposals. Journal of Medical Ethics, 42(4), 211-215, BMJ Group, United Kingdom.

Paulus, W. (2011). Transcranial electrical stimulation (tES-tDCS; tRNS, tACS) methods. Neuropsychological Rehabilitation, 21(5), 602-617, Taylor and Francis Ltd., United Kingdom.

Remedios, L., & Gruart, A. (2019). Effects of Short-Term Random Noise Electrical Stimulation on Dissociated Pyramidal Neurons from the Cerebral Cortex. Neuroscience, 404, 10-20, Elsevier. Netherlands.

Savic, B., & Meier, B. (2016). How Transcranial Direct Current Stimulation Can Modulate Implicit Motor Sequence Learning and Consolidation: A Brief Review. Frontiers in Human Neuroscience, 10, 26, Frontiers Media SA, Switzerland.

Davis, S. E., & Smith, G. A. (2019). Transcranial Direct Current Stimulation Use in Warfighting: Benefits, Risks, and Future Prospects. Frontiers in Human Neuroscience, 13, 114, Frontiers Media SA, Switzerland.

Van der Groen, O., & Wenderoth, N. (2016). Transcranial random noise stimulation of visual cortex: Stochastic resonance enhances central mechanisms of perception. The Journal of Neuroscience, 36(19), 5289-5298., Society for Neuroscience, United States.

Fertonani, A., Pirulli, C., & Miniussi, C. (2011). Random noise stimulation improves neuroplasticity in perceptual learning. The Journal of Neuroscience, 31(43), 15416-15423, Society for Neuroscience, United States.

Moliadze, V., Fritzsche, G., & Antal, A. (2014). Comparing the efficacy of excitatory transcranial stimulation methods measuring motor evoked potentials. Neural Plasticity, 125(2), 289-298, Hindawi Publishing Corporation, United States.

Van der Groen, O., Tang, M. F., Wenderoth, N., & Mattingley, J. B. (2018). Stochastic resonance enhances the rate of evidence accumulation during combined brain stimulation and perceptual decision-making. PLoS Computational Biology, 14(11), e1006301, Public Library of Science (PLOS), United States.

Anli Liu, Mihály Vöröslakos, Greg Kronberg, Simon Henin, Matthew R. Krause, Yu Huang, Alexander Opitz, Ashesh Mehta, Christopher C. Pack, Bart Krekelberg, Antal Berényi, Lucas C. Parra, Lucia Mellonim Orrin Devinsky, and György Buzsáki(2016). Immediate neurophysiological effects of transcranial electrical stimulation. Nature Communications, 7, 11110, Nature Portfolio (Division of Springer Nature), United Kingdom.

Grossman, N., Bono, D., Dedic, N., Kodandaramaiah, S. B., Rudenko, A., Suk, H. J., Cassara, A. M., Neufeld, E., Kuster, N., Tsai, L. H., & Boyden, E. S. (2017). Non-invasive deep brain stimulation via temporally interfering electric fields. Cell, 169(6), 1029-1041.e16, Cell Press (Part of Elsevier), United States.

Giacomo Koch, Daniele Altomare, Alberto Benussi, Lucie Brechet, Elias P. Casula, Alessandra Dodich, Michela Pievani, Emiliano Santarnecchi, and Giovanni B. Frisoni (2024). The emerging field of non-invasive brain stimulation in Alzheimer's disease: A review. Brain, 147, 4003-4016, Oxford University Press, United Kingdom.

* cited by examiner

Damping Modulation for Cross Frequency Recruitment and Entrainment

Sub-Electrode Activation Sequence

TRANSCRANIAL ELECTRICAL STIMULATION USING POLY-MODULATED WAVEFORMS

CROSS-REFERENCE TO RELATED APPLICATIONS

This is a Non-Provisional Patent Application that claims priority to Provisional Patent Application 63/615,771 entitled "Transcranial Electrical Stimulation Using Poly-Modulated Waveforms" filed Dec. 28, 2023.

INCORPORATION BY REFERENCE

All publications, including patents and patent applications, mentioned in this specification are herein incorporated by reference in their entirety to the same extent as if each individual publication was specifically and individually cited to be incorporated by reference. This includes U.S. Pat. No. 11,634,281.

FIELD OF THE INVENTION

Described herein are systems for using amplitude-modulated Transcranial Pulsed Random Noise Stimulation for tissue neuromodulation including modulation in the central nervous system.

BACKGROUND OF THE INVENTION

Different modes of Transcranial Electrical Stimulation (tES) already exist including transcranial Direct Current Stimulation (tDCS), transcranial Alternating Current Stimulation (tACS), and transcranial Pulsed Current Stimulation (tPCS) (Jaberzadeh S, Bastani A, Zoghi M, Morgan P, Fitzgerald PB (2015) Anodal Transcranial Pulsed Current Stimulation: The Effects of Pulse Duration on Corticospinal Excitability. PLOS ONE 10 (7): e0131779. https://doi.org/10.1371/journal.pone.0131779). A version of Transcranial Pulsed Random Noise Simulation also appears in the prior art (Moret, B., Donato, R., Nucci, M. et al. Transcranial random noise stimulation (tRNS): a wide range of frequencies is needed for increasing cortical excitability. Sci Rep 9, 15150 (2019). https://doi.org/10.1038/s41598-019-51553-7); but the approach of applying amplitude modulation in which there is ongoing alternative changing of the direction of the pulsing from positive going to negative going and vice versa, which is the innovation of the current invention does not appear in the prior art.

SUMMARY OF INVENTION

Our brain stimulation device utilizes non-invasive transcranial electrical stimulation to modulate brain activity. It can function in an open loop configuration without feedback or in a closed loop arrangement where feedback derived invasively or non-invasively from the brain drives changes to the stimulation. Specifically, the device generates complex poly-modulated waveforms by combining multiple pulse parameters in a randomized manner across 2 or more parameters. These parameters include but are not limited to: Pulse Amplitude (0-8 mA); Pulse Duration (0-60 sec); Total Session Length (0-60 min); Pulse Frequency (0-100 kHz); Polarity Switch Frequency (0-1 kHz); Inter-Pulse Interval (0-60 sec); Intra-Pulse Interval (0-60 sec); Pulse Rise/Fall Time (0-1 sec); Pulse Duty Cycle (0-100%); Pulse Ramp (0-60 sec); Pulse Offset (0-60 min) and Pulse Train Duration (0-60 min). The electrode arrays attached to the device can stimulate and/or sense neural activity. Finally, the randomized poly-modulated waveforms are targeted towards specific neural pathways, discrete brain regions, distributed functional brain networks as well as white matter connections in the brain. The closed loop feedback enables adaptive, personalized stimulation by modulating the waveform parameters based on each individual's distinct brain activity patterns measured invasively or non-invasively.

The poly-modulated waveform pulse parameters generated encompass various modulation techniques, including digital, analog, and hybrid, by combining multiple modulated pulse parameters. This allows for complex and customizable waveforms to be produced through these different modulation methods. The device incorporates a circuit board system that can dynamically adjust waveform pulse parameters outputs in real-time for transcranial electrical stimulation. Its functions include receiving neural or impedance signals from multiple sensors, converting these signals into modulated waveform pulse parameters, generating control signals by processing the converted waveforms, transmitting adjusted waveforms to IoMT devices through an output interface, receiving input from IoMT devices to further adjust parameters, and running machine learning algorithms to analyze data from sensors. This closed-loop system allows adaptive modulation of the waveform parameters based on physiological feedback.

The adaptive neuromodulation waveform pulse parameters protocols are configured to account for individual, partners, familial, and group variations in factors like brain anatomy, physiology, and responses to stimulation. This allows the protocols to be optimized for diverse patient populations and tailored to variations across individuals and groups in aspects that impact treatment outcomes. The device pre-distorts stimulation waveform pulse parameters before they enter tissue. This enhances precision, effectiveness, and the share of delivered stimulation. Pre-distortion combines various methods like waveform shaping based on impedance compensation, accounting for scalp-cortex distance, real-time parameter adjustment, and adapting waveforms to an individual's neuroanatomy.

The circuit board system includes components like CPU, RAM/ROM memory, internal communications bus, special-purpose processors for AI/machine learning, encryption, electrode array processing, etc., power manager, battery, wired/wireless external interfaces, stimulation output controller, and EEG data acquisition module. This allows for integrated waveform generation, impedance sensing, closed-loop feedback, onboard computation, programmable delivery, communication with external systems, and collection of brain activity data. The device incorporates a circuit-board system where the IoMT network connectivity uses wired or wireless communications interfaces to connect with external devices. The base circuit board system is Bluetooth-enabled using analog, digital or hybrid methods and can dynamically adjust stimulation waveform pulse parameters based on real-time neural feedback. The circuit-board system has a user interface that supports functions like configuring waveform parameters, adjusting sensor groupings, connecting to IoMT networks via Bluetooth or wired connections, monitoring system performance, and allowing both manual intervention and automatic adaptation. The device provides ancillary stimulation using small pulses<100 uA, sounds, vibrations or heat that are adjusted by participant physiology. This creates an effect of providing user feedback that neuromodulation is occurring or acts as a placebo stimulation.

The circuit-board system has a dynamic sensor array composed of different materials for various sensing modalities including conductive polymers, metal electrodes, and biocompatible materials. The sensor array characteristics facilitate conformation to head shape variations and changes in electrode positioning. This includes a flexible grid structure composition, a sliding mechanism enabling continuous electrode density/spacing adjustment, dynamic composition with different sensor materials for different modalities, and allowing specific spacing adjustments from 0.01-10 inches to optimize signal detection across anatomical variations. The device incorporates a circuit-board system configured to modify electrode sensor group sizes by performing actions like firing, switching, grouping, grounding, and deactivating sub-electrode contacts in the network. This changes characteristics like shape, orientation, positioning, and voltage gradient geometry delivered through the sub-network. The device can be applied to different body parts with dynamic sensor arrays where grouping adjusts based on the stimulation target whether it be a specific body region or in-vitro samples.

Closed-loop feedback driven by non-invasive, minimally-invasive or invasive modalities like fMRI, CT, PET, EEG, MEG, fNIRS, EIT, ECOG, iEEG, and MIT can provide input at various temporal synchronizations in-phase, anti-phase, simultaneous, pre/during/post stimulation, sequenced, intermittent within single or across multiple sessions. Other biosignals like heart rate, blood pressure, temperature, respiration, skin conductivity, and movement can also provide feedback. The device utilizes Electrical Impedance Tomography at multiple frequencies for real-time monitoring of tissue physiological changes and impedance variations. This tracks real-time shifts at different frequencies to assess blood flow, cellular activity, and functional responses. Closed-loop feedback modalities also include real-time data from wearable trackers, vital sign/implantable medical devices, remote patient monitoring, smart home devices, mobile health apps, smart pill dispensers, telemedicine equipment, inhalers, ECG/blood glucose/temperature/fall detection monitors, teleradiology/ophthalmology/psychiatry devices, activity/dialysis/wound/rehab monitors, telemonitoring cameras, telehealth kiosks, medication dispensers, cardiac/EEG monitors, connected glucometers, inhalers, and wearable patches. This IoMT-networked data helps dynamically optimize the neuromodulation device's poly-modulated waveform pulse parameters.

The device results in specific neuromodulation effects that enhance selectivity and targeting of desired neuronal circuits by varying the poly-modulated waveform parameters. The generated waveforms are based on computational models like artificial intelligence, machine learning, mathematical models, Kuramoto models, molecular dynamics, natural language processing, multi-tract analysis, network prediction, phase diagrams, stochastic processes, tract identification with diffusion tensor imaging, hyper-scanning, dose-response curves, and digital twins.

Different computational model types are used to optimize the waveform parameters including quantitative systems pharmacology, Kuramoto, neural network, Hodgkin-Huxley, integrate-and-fire, mean field, biophysical, reaction-diffusion, agent-based, genetic regulatory networks, pharmacokinetic/pharmacodynamic, molecular dynamics simulations, systems biology, computational fluid dynamics, and mechanical models. These simulate brain dynamics, neuron behavior, genetic regulation, pharmacokinetics, fluid dynamics and mechanical properties to predict optimal waveform parameters. The device's computer models integrate various stochastic techniques including probability distributions, random number generators, stochastic processes, Monte Carlo methods, random walks, stochastic differential equations, stochastic optimization algorithms, agent-based models, spatial stochastic models, stochastic games, stochastic Petri nets, stochastic context-free grammars, stochastic frontier analysis, and stochastic volatility models.

These simulate and analyze the impacts of randomizing pulse parameters across dimensions like amplitude, frequency, phase, timing, synchronization. Randomization can occur in-phase, anti-phase, simultaneous, pre/during/post stimulation, sequenced, intermittently within single or across multiple sessions. The models optimize waveform parameters for open and closed-loop transcranial electrical stimulation. They predict optimal settings for targeted neural modulation. Neural network models learn complex relationships between parameters and neural responses from empirical data. Machine learning algorithms like genetic algorithms, particle swarm optimization, and Bayesian optimization systematically explore the high-dimensional parameter space.

The integration of stochastic techniques, neural networks, and optimization algorithms allows in-depth simulation of randomized waveforms and empirical determination of optimal protocols tailored to individuals. The device's stimulation waveforms over time can be applied to various neuromodulation approaches including photobiomodulation, transcranial magnetic stimulation, transcranial direct current stimulation, transcranial random noise stimulation, transcranial pulsed current stimulation, transcranial alternating current stimulation, transcutaneous electrical nerve stimulation, invasive/noninvasive vagus nerve stimulation, spinal cord stimulation, optogenetics, and pulsed electromagnetic field therapy.

The device is applied to treat neurological disorders including Parkinson's disease, Alzheimer's disease, epilepsy, ischemic stroke, hemorrhagic stroke, multiple sclerosis, ALS, Huntington's disease, migraine, traumatic brain injury, neuropathic pain, depression, anxiety disorders, bipolar disorder, schizophrenia, OCD, PTSD, Tourette's syndrome, and restless legs syndrome.

Associated biomarkers that are measured include: alpha-synuclein aggregates, beta-amyloid plaques, tau tangles, abnormal electrical activity/seizures, brain imaging of damaged regions, demyelinated lesions, motor neuron degeneration, expanded CAG repeats, cerebral blood flow changes, trigeminovascular activation changes, structural damage, altered neurochemical levels, abnormal nerve signaling/hypersensitivity, neurotransmitter level changes like serotonin, neurotransmitter dysregulation, neural circuit dysregulation, mood/energy/activity oscillations, neurotransmitter signaling disturbances, cortico-striatal circuit alterations, brain region hyperactivity, motor/vocal tics, uncomfortable leg sensations, urge to move legs.

The device's stimulation can be used for anticipating, monitoring, and aborting epileptic seizures. This allows detection of early seizure activity and responsive modulation to prevent progression to full seizures.

The device utilizes simultaneous multiregional, multi-track, multi-network brain stimulation across either single or multiple electrode pairs. The order delivery to different electrode pairs adapts based on biomarkers and computer modeling data. Stimulation applies simultaneously, intermittently, or sequentially across different brain regions and networks. This enables concurrently modulating distributed epileptic circuits to precisely suppress seizure initiation and spread. Flexible coordination of stimulation timing and location achieves optimal disruption of ictal activity. The device uses dense electrodes incorporating randomization, pathway adaptation, adaptive placement, feedback control, machine learning, and visualization interfaces. This multifaceted approach ensures precise personalized targeting.

The device and connected elements use federated learning and blockchain for data privacy, security and collaborative learning. Federated learning develops a shared model without sharing raw data. Blockchain provides transparent ledgers for functions like secure data management, storing metadata on data contributors/permissions/model updates. This enhances data integrity, traceability, access control, and consent management. Interactions between the device and patients can be facilitated by natural language processing and ChatGPT. This includes personalized responses, context-aware recommendations, waveform optimization, and real-time feedback that enhances patient engagement. The intuitive interaction improves understanding and efficacy.

The device incorporates predicted neuroimaging data from generative imaging to refine selection of optimal waveform parameters. Generative models synthesize realistic MRI/fMRI data, providing additional in-silico brain data to simulate waveform effects across varied anatomy and inform parameter optimization. Optimization spans single/multiple brain regions, networks, tracts using single/multiple electrode pairs. Concurrent or sequential targeting of distinct areas like brain regions, networks, tracts is enabled. This multi-area coordination discovers globally optimal settings across localized sub-networks.

Hyper-scanning techniques include simultaneous multi-brain stimulation and recording across two or more participants. Stimulation adapts in real-time based on inter-brain interactions and synchronized neural activity patterns. Cross-participant feedback ensures waveforms synchronize with emergent collective dynamics. Integrating generative neuroimaging, multi-target optimization, and hyper-scanning stimulation allows comprehensive parameter tuning tailored to individuals and responsive to real-time brain states across people.

The device generates a digital twin of the subject based on optimized pulse parameters. The digital twin incorporates personalized physiological and neurological data, simulating dose-response curves of transcranial electrical stimulation waveforms and biomarkers. This predicts individualized neural modulation responses to parameter changes.

The circuit-board system comprises memory management components like caching mechanisms, hierarchical memory structures, and compression techniques. These optimize access patterns and storage efficiency for the significant data processing demands of closed-loop control, analytics, and digital-twin simulation.

Pathway Hierarchical Adaptive Referencing allows systematic organization of the device's capabilities into a layered architecture. This structures key features into foundational, intermediate, and high-level tiers to balance flexibility, performance, and interpretability. The hierarchical levels enable nuanced mapping of low-level parameters to emerging network-level dynamics while retaining intelligibility. The digital twin integration, efficient memory architecture, and pathway referencing provide sophisticated personalization and real-time adaptation rooted in explainable mechanisms tuned to individual neurophysiology.

The circuit-board system incorporates capabilities for Pathway Hierarchical Adaptive Referencing. This includes integrated algorithms such as optimal tree search, machine learning, spatial correlation assessment within digital logic components, and control logic that dynamically adjusts hierarchical configurations based on real-time signal characteristics, energy monitoring, and energy management units to regulate energy distribution complying with energy constraints. The Pathway Hierarchical Adaptive Referencing circuit board system comprises hierarchical layers of multiplexers for sensor electrode data inputs, sensor electrode waveform parameter modulation outputs, and dynamic grouping configurations; parallel processing units distributed across hierarchical layers for evaluating optimal tree configurations and machine learning optimization; real-time signal analysis components for adaptive configuration adjustments based on signal characteristics; real-time signal output components for stochastic digital, analog, and hybrid waveform parameter modulation; energy-monitoring components; and energy managing components for regulating energy distribution adhering to energy constraints.

The circuit-board system incorporates capabilities for optimizing EEG/tES inputs/outputs through a Pathway Hierarchical Adaptive Referencing strategy, comprising a multi-layered multiplexer hierarchy that accommodates sensor-electrode data input/outputs and dynamically configures sensor electrode grouping; control logic units for real-time analysis of signal characteristics, sampling rates, sensor electrode sub-grouping dynamics, and energy consumption, enabling adaptive configuration adjustments; parallel-processing units for evaluating optimal tree configurations distributed across hierarchical layers; and optimized routing algorithms for efficient data flow between multiplexers, reducing signal propagation delay.

The circuit board system comprises a computer-readable storage medium containing instructions for implementing the Pathway Hierarchical Adaptive Referencing system, including algorithm implementation steps such as optimal tree search, machine learning, and spatial correlation assessment; digital logic design instructions for modeling control logic, hierarchical layers of multiplexers, and parallel processing units; waveform parameter modulation instructions; and signal-processing instructions including noise reduction, signal conditioning, and waveform parameter pre-distortion to improve signal quality.

The Pathway Hierarchical Adaptive Referencing circuit board system incorporates memory management components that optimize memory access patterns, including caching mechanisms, hierarchical memory structures, and memory compression techniques. The circuit board system incorporates a pathway hierarchical adaptive referencing system that can adjust the waveform pulse parameters using an analog, digital, or hybrid mechanism being delivered through modulation techniques such as pulse-amplitude modulation, pulse-width modulation, pulse-frequency modulation, and pulse-position modulation. The electrodes can employ the Pathway Hierarchical Adaptive Reference circuit board system (PHARC) to dynamically adjust the sub-electrode activation sequence based on real-time neural response monitoring to optimize neuromodulation effectiveness.

The closed-loop feedback modulates for identifying epileptogenic brain tissue by obtaining intracranial electroencephalogram (iEEG) signals from a patient with epilepsy; sampling said iEEG signals at a sampling frequency of at least 2000 Hz; applying a high-pass filter of 80 Hz or higher to said sampled iEEG signals to obtain filtered signals; detecting high-frequency oscillation (HFO) events in said filtered signals, said HFO events being bursts of activity between 80-500 Hz; and generating an HFO map indicating brain regions exhibiting said HFO events, wherein said regions exhibiting a threshold number of HFO events are identified as epileptogenic tissue.

The device employs a damped randomized frequency modulation technique for stimulating endogenous neural oscillations, wherein stimulation pulses converge towards therapeutic brainwave bands through a mathematical model incorporating attraction and stability principles, preventing habituation. The system further allows precise parameter control including intra-range modulation for seamless fluctuations, continuous inter-range modulation for smooth dynamic shifts, and discrete inter-range modulation for controlled variability, enabling therapeutic exploration within neuromodulation applications.

The device employs a frequency modulation module for versatile stimulation, utilizing techniques such as chaotic frequency hopping, Markov-chain frequency switching, multi-harmonic frequency resonance, noise resonance pumping, evolutionary frequency walks, entropy-maximization sampling, fractal frequency sets, and chaotic resonance hopping. The system incorporates statistical distributions including Triangular, Pyramidal, Gapped, Uniform, Inverse Square Root, Normal, Geometric, Exponential, Gamma, Beta for random frequency variation, ensuring tailored uncertainty injection to enable personalized neurostimulation waveform pulse parameters.

BRIEF DESCRIPTION OF THE DRAWINGS

Various embodiments are illustrated by way of example in the figures of the accompanying drawings. Such embodiments are demonstrative and not intended to be exhaustive or exclusive embodiments of the present subject matter.

DETAILED DESCRIPTION OF THE INVENTION

The disclosed neuromodulation device leverages proprietary poly-modulated waveforms for targeted, non-invasive neural circuit activation via open or closed-loop feedback transcranial electrical stimulation (tES). The core innovation lies in synthesizing multifaceted electrical waveforms by adroitly modulating and combining diverse pulse parameters to enable dynamic current sculpting. This produces mathematical waveforms with intricacy and versatility unmatched in conventional tES, allowing customized frequency tuning for selective pathway stimulation. Ultimately, the system delivers a breakthrough in non-invasive yet precise neuromodulation through the agile waveform generation paradigm, significantly improving modulation specificity and adaptability across various applications.

Mathematically, the poly-modulated waveform can be expressed as: $W(t)=\Sigma(i=1 \text{ to } N) A_i P_i(t) M_i(t) F_i(t)$ Where: $W(t)$ represents the poly-modulated waveform over time. N is the total number of modulated pulses. $A_i$ denotes the amplitude of the ith pulse. $P_i(t)$ is the pulse shape function for the ith pulse. $M_i(t)$ represents the modulation function for the ith pulse. $F_i(t)$ signifies the frequency modulation function for the ith pulse. The selection of modulation frequencies within the poly-modulated waveform is a critical aspect of this invention. By carefully choosing these frequencies, the device achieves specific neuromodulation effects, enhancing selectivity and precisely targeting desired neuronal circuits.

Precise Control of Stimulation Parameters

Figure 1:
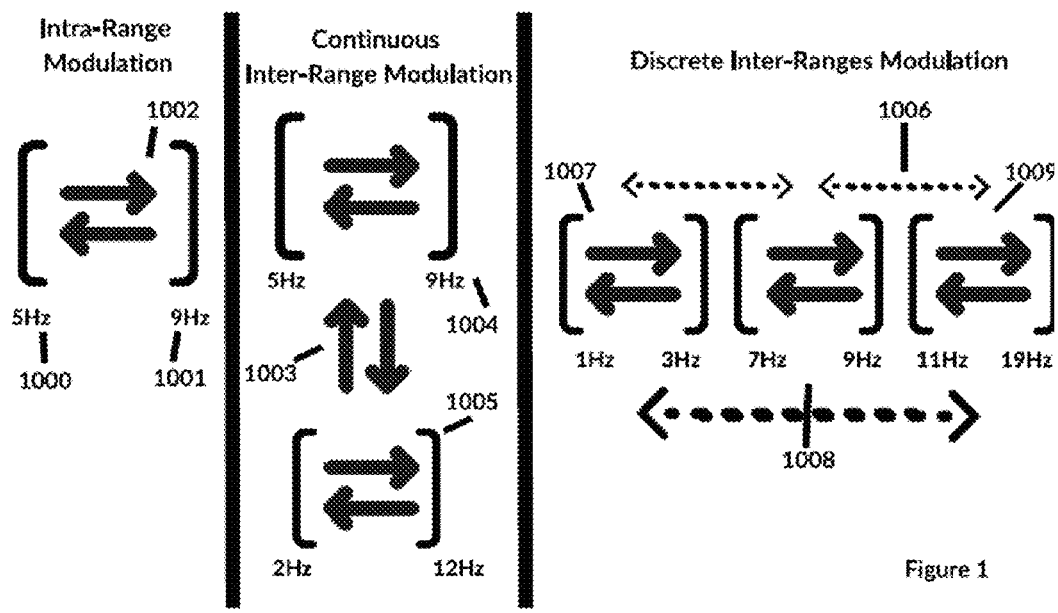
FIG. 1 illustrates three types of modulation: Intra-Range, Continuous Inter-Range, and Discrete Inter-Ranges, each associated with arbitrary frequency values.

In the domain of neuromodulation, the precise control of stimulation parameters, as shown in FIG. 1, denoted by the variable x(t) with respect to time(t), is a pivotal aspect. The concept of intra-range modulation involves the dynamic variation of x(t) within specified bounds, Xmin 1000 and Xmax 1001, utilizing a formula incorporating normalized random values called intra-range modulation 1002. This results in a continuous, seamless fluctuation of x(t), promoting variability in parameters such as amplitude, frequency, and pulse width during the stimulation duration. The statistical framework for this technique involves a uniform probability density function and cumulative distribution function. Moving to continuous inter-range modulation 1003, x(t) alternates between two distinct ranges [Xmin1, Xmax1] 1004 and [Xmin2, Xmax2]1005 during odd and even intervals, respectively, producing smooth and dynamic parameter shifts. Finally, discrete inter-range modulation 1006 introduces abrupt transitions between N separate ranges [Xmin1, Xmax1]1007, [Xmin2, Xmax2]1008, . . . [XminN, XmaxN] 1009, where x(t) jumps randomly between these ranges at discrete times, providing controlled variability. These algorithmic approaches form the foundation for exploring therapeutic windows in neuromodulation by strategically injecting variability into stimulation parameters.

Let the stimulation parameter be denoted by x(t) where t represents time.

Intra-Range Modulation:

x(t) varies randomly between set bounds Xmin and Xmax per:

$x(t)=X\text{min}+(X\text{max}-X\text{min})*\text{rand}(\ )$ where rand( ) produces normalized random values between 0 and 1. This creates seamless fluctuations.

The parameter statistics have a uniform distribution with probability density function:

$f(x)=1/(X\text{max}-X\text{min})$ for $X\text{min} \leq x \leq X\text{max}$ and cumulative distribution function:

$F(x)=(x-X\text{min})/(X\text{max}-X\text{min})$ x(t) switches between two ranges [Xmin1, Xmax1] and [Xmin2, Xmax2] randomly over time:

$x(t)=\{X\text{min1}+(X\text{max1}-X\text{min1})*\text{rand}(\ )$ for $t \in$ Odd Intervals $X\text{min2}+(X\text{max2}-X\text{min2})*\text{rand}(\ )$ for $t \in$ Even Intervals$\}$ where odd/even time intervals alternate continuously. This produces smooth dynamic shifts.

Discrete Inter-Range Modulation:

x(t) jumps randomly between N separate ranges [Xmin1, Xmax1], [Xmin2, Xmax2], ... [XminN, XmaxN]:

$$x(t)=Xmini+(Xmaxi-Xmini)*rand(\ )$$

where i switches between 1 to N randomly at discrete times.

The mathematical integration of probability, statistics, stochastic processes and dynamical frameworks provides a versatile foundation for implementing randomized stimulation protocols to avoid accommodation. The approaches facilitate exploration of parameter spaces for identifying therapeutic windows.

The core philosophy underlying the proposed randomization techniques is to introduce controlled variability into stimulation parameters to avoid physiological accommodation and enhance therapeutic effects. The intra-range modulation approach achieves this by continuously fluctuating parameters like amplitude, frequency and pulse width seamlessly between upper and lower bounds randomly over the duration of stimulation. This creates smooth transitions between values within a set range to facilitate neural plasticity.

The continuous inter-range modulation builds further variability by continuously alternating the stimulus parameter between two distinct ranges randomly over time. For instance, the parameters could shift between varying in a low vs high domain over multiple transitions within a session. This leverages the benefits of neural excitation through both domains while enhancing complexity to prevent habituation.

Finally, the discrete inter-range modulation approach abruptly transitions the stimulus parameters between multiple non-overlapping random ranges repeatedly in a discontinuous jumping fashion. So parameters disproportionately shift entirely between discrete domains to activate diverse neural processes. The discrete hopping increases uncertainty to maximize plasticity.

Together, these algorithmic randomization approaches spanning temporal, magnitude and dynamic domains allow customized injection of variability into neuromodulation waveforms to optimize response. The techniques provide a mathematical foundation for exploration of parameter spaces to identify therapeutic windows for diverse indications.

Temporal Synchronization

Figure 2:
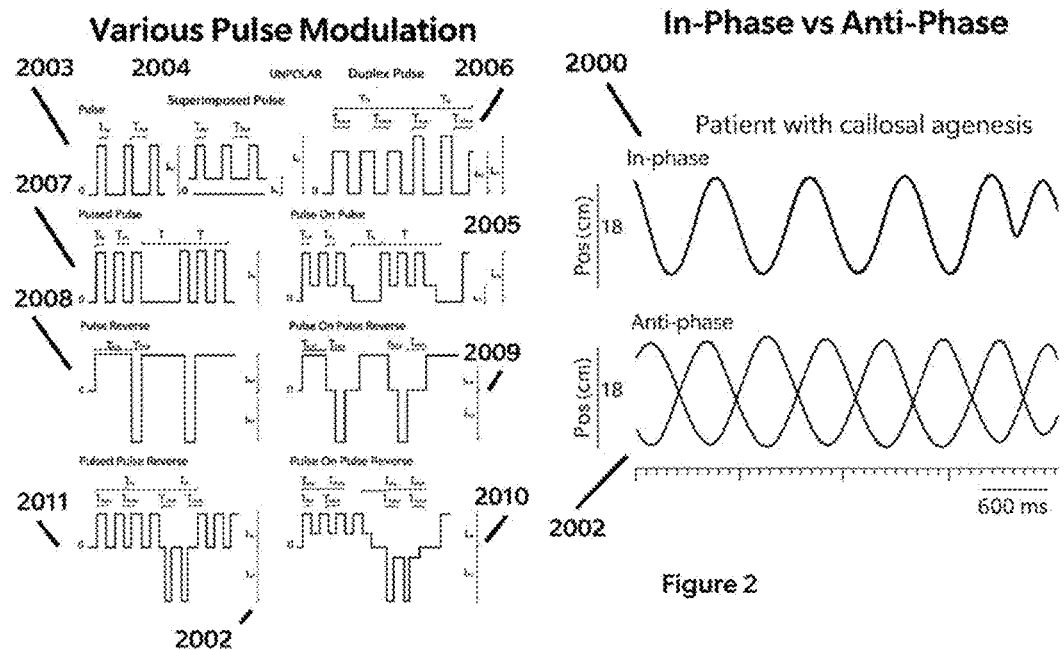
FIG. 2 presents diagrams of various pulse modulations on the left and a comparison of in-phase and anti-phase waveforms on the right.

Temporal synchronization is pivotal for operating the device and can be adjusted to meet specific needs across a spectrum of timing configurations. As in FIG. 2, these include in-phase 2000, anti-phase 2001, simultaneous, pre/in/post-stimulation, sequenced, and intermittent modes. Flexibility in synchronization ensures optimal interaction between stimulation and feedback for each use case. Additionally, synchronization can extend across sessions, enabling a longitudinal approach within and across multiple sessions. This allows for studying and manipulating neural responses over long periods, providing a valuable tool for long-term research and therapeutic interventions.

This paragraph pertains to a device that generates poly-modulated waveforms by combining multiple modulated pulse parameters encompassing selected modulation schemes and various base pulse shapes. The device is capable of outputting signals in digital, analog, and/or hybrid current modes, with modulation techniques including Pulse-amplitude modulation (PAM), Pulse-width modulation (PWM), Pulse-frequency modulation (PFM), Pulse-position modulation (PPM), Quadrature amplitude modulation (QAM), and multiple base pulse shapes 2002 such as Basic pulse 2003, superimposed pulse 2004, pulse-on-pulse 2005, duplex pulse 2006, pulsed pulse 2007, pulse reverse 2008, pulse reverse with off-time 2009, pulse-on-pulse reverse 2010, and pulsed pulse reverse 2011.

The invention encompasses a versatile device that facilitates the generation of poly-modulated waveforms. These waveforms are produced by manipulating multiple modulated pulse parameters, allowing for a wide range of applications and use cases. The device's adaptability is a key feature, as it can operate in digital, analog, or hybrid current output modes. This flexibility ensures compatibility with diverse electronic systems and devices.

One of the key aspects of the device is its capability to implement various modulation schemes. These modulation schemes include but are not limited to Pulse-amplitude modulation (PAM), which involves varying the amplitude of the output pulses to convey information. Pulse-width modulation (PWM) is another modulation scheme, where the width of the pulses is altered in response to the input signal. Pulse-frequency modulation (PFM) involves changing the frequency of the pulses, while Pulse-position modulation (PPM) involves altering the position of pulses in relation to specific reference points. Furthermore, Quadrature amplitude modulation (QAM) is employed, which allows for multi-dimensional modulation of the output signal.

In addition to the modulation schemes, the invention also covers various base pulse shapes that can be employed. These base pulse shapes are fundamental in defining the characteristics of the generated waveforms. The device allows for the selection and combination of base pulse shapes, including Basic pulse, superimposed pulse (where multiple pulses overlap), pulse-on-pulse (where pulses are stacked), duplex pulse (comprising two distinct pulses), pulsed pulse (characterized by pulsing within pulses), pulse reverse (where pulse polarity is inverted), pulse reverse with off-time (pulse reversal with off periods), pulse-on-pulse reverse (overlapping pulses with polarity inversion), and pulsed pulse reverse (pulsing within inverted pulses).

In accordance with the device as described herein, a detailed mathematical formulation and analysis of the poly-modulated waveforms generated through the combination of multiple modulated pulse parameters encompassing digital, analog, and/or hybrid current output, modulated with various modulation schemes such as Pulse-amplitude modulation (PAM), Pulse-width modulation (PWM), Pulse-frequency modulation (PFM), Pulse-position modulation (PPM), and Quadrature amplitude modulation (QAM), is presented herein. Let x(t) represent the input signal to the device, which undergoes modulation. The output signal y(t) is obtained by combining multiple modulated pulse parameters, expressed mathematically as y(t)=x(t) g(t), where g(t) is the modulating function. This function varies based on the modulation scheme. For Pulse Amplitude Modulation (PAM), g(t) equals the sum of amplitude values $A\_n$ at discrete time intervals nT multiplied by an impulse function. For Pulse Width Modulation (PWM), g(t) is the rectangular pulse function with width set by the duty cycle D. In Pulse Frequency Modulation (PFM), g(t) is a series of impulse functions separated by the frequency period $T\_f$. For Pulse Position Modulation (PPM), g(t) is a series of impulses at times $t\_n$ representing pulse positions. Quadrature Amplitude Modulation (QAM) has g(t) defined in terms of the in-phase and quadrature components I(t) and Q(t) multiplied by cosine and sine functions at the carrier frequency $f\_c$.

In the case of hybrid current output, additional mathematical expressions can be incorporated to describe the conversion of the modulated signal into a current output, which may involve circuit equations and transfer functions. The resulting mathematical model comprehensively captures the generation of poly-modulated waveforms using various modulation techniques, thereby providing a foundation for the device's operation.

In the context of the patent application, we are describing a device that generates poly-modulated waveforms by combining multiple modulated pulse parameters. These modulated pulse parameters can take various forms, such as Basic pulse, superimposed pulse, pulse-on-pulse, duplex pulse, pulsed pulse, pulse reverse, pulse reverse with off time, pulse-on-pulse reverse, and pulsed pulse reverse. The mathematical formulation for generating these poly-modulated waveforms can be expressed as follows:

Let f(t) represent the poly-modulated waveform generated by the device, and t denote time. We can represent each of the modulated pulse parameters as mathematical functions:

1. Basic Pulse (B(t)): A basic pulse waveform that can be described using mathematical functions such as Gaussian functions or rectangular functions.
2. Superimposed Pulse (S(t)): This waveform can be obtained by adding two or more basic pulse waveforms with suitable amplitudes and time shifts:

$$S(t) = B(t - t\_1) + B(t - t\_2) + \ldots$$

3. Pulse-on-Pulse (P(t)): This waveform can be generated by convolving two basic pulse waveforms:

$$P(t) = \int [\text{from } -\infty \text{ to } \infty] B(\tau) B(t - \tau) d\tau$$

4. Duplex Pulse (D(t)): A duplex pulse can be generated by multiplying two basic pulse waveforms:

$$D(t) = B(t) B(t - t\_d)$$

5. Pulsed Pulse (PP(t)): Pulsed pulse can be generated by periodically switching a basic pulse waveform:

$$PP(t) = B(t) \sum [\text{from } -\infty \text{ to } \infty] \delta(t - nT)$$

6. Pulse Reverse (PR(t)): Inverting the basic pulse waveform can yield a pulse reverse:

$$PR(t) = -B(t)$$

7. Pulse Reverse with Off Time (PRO(t)): This waveform can be obtained by introducing an off-time T_off between inverted pulses:

$$PRO(t) = -B(t) \sum [\text{from } -\infty \text{ to } \infty] \delta(t - nT - T\_off)$$

8. Pulse-on-Pulse Reverse (POR(t)): This waveform combines pulse-on-pulse and pulse reverse operations:

$$POR(t) = -\int [\text{from } -\infty \text{ to } \infty] B(\tau) B(t - \tau) d\tau$$

9. Pulsed Pulse Reverse (PPR(t)): Pulsed pulse reverse can be generated by periodically switching an inverted basic pulse waveform:

$$PPR(t) = -B(t) \sum [\text{from } -\infty \text{ to } \infty] \delta(t - nT)$$

The present invention pertains to a device capable of generating poly-modulated waveforms through a combination of multiple modulated pulse parameters. These waveforms are designed to encompass a wide range of modulation techniques, catering to both digital and analog applications, as well as hybrid configurations that blend elements of both digital and analog modulation. The modulated pulse parameters can be effectively utilized to modulate the device's output in various ways, including but not limited to the following modulation schemes:

The device supports a wide range of amplitude, angle, and complex modulation techniques including amplitude modulation (AM) where the carrier signal's amplitude is varied based on the modulating signal; double-sideband modulation (DSB) and its variations like DSB with carrier (DSB-WC), DSB suppressed carrier (DSB-SC), and DSB reduced carrier (DSB-RC); single-sideband modulation (SSB) methods such as SSB with carrier (SSB-WC) and SSB suppressed carrier (SSB-SC); vestigial sideband modulation (VSB); quadrature amplitude modulation (QAM) combining amplitude and phase shifts; frequency modulation (FM) varying the carrier frequency based on the modulating signal; phase modulation (PM) shifting the carrier phase; and unique techniques like transpositional modulation (TM) where each quarter cycle is transposed with adjustable AM and phase. This comprehensive modulation support ensures versatility for diverse signaling requirements and precise control over all modulation parameters.

$$x(t) = A(t) \cos(2\pi f\_ct + \varphi(t))$$

where:
x(t) represents the generated waveform.
A(t) is the instantaneous amplitude, which can be a function of time or another modulating signal.
f_c is the carrier frequency.
φ(t) is the instantaneous phase, which may also be modulated.

The device's versatility extends to accommodating various modulation schemes, each with its mathematical underpinning. The device supports amplitude modulation (AM) where the carrier amplitude A(t) equals the carrier amplitude A_c plus the modulating signal m(t) multiplied by the modulation index k_a; double-sideband modulation (DSB) with phase modulation from q(t); DSB with carrier (DSB-WC) adding an unmodulated carrier term; DSB suppressed carrier (DSB-SC) with no carrier component; DSB reduced carrier (DSB-RC) with only one sideband; single-sideband modulation (SSB) containing either upper or lower sideband; SSB with carrier (SSB-WC) reincorporating the carrier signal; SSB suppressed carrier (SSB-SC) removing the carrier again; vestigial sideband modulation (VSB) with a vestigial lower sideband; quadrature amplitude modulation (QAM) combining baseband signals I(t) and Q(t); frequency modulation (FM) shifting the carrier frequency based on m(t) and sensitivity k_f; phase modulation (PM) altering carrier phase by the modulating signal and sensitivity k_p; and unique transpositional modulation (TM) with carrier frequency determined by an AM and phase modulation function f(AM, θ(t)). This allows precise control over all parameters for diverse modulation types.

A key innovation of the device is its approach to poly-modulated waveform generation through skillful combination of various modulated pulse parameters across digital, analog, and hybrid current outputs. Core modulation techniques leveraged include amplitude modulation (AM) to vary carrier signal amplitude; phase-shift keying (PSK) manipulating phase to encode data; frequency-shift keying (FSK) shifting between frequencies; amplitude-shift keying (ASK) altering amplitude levels; and quadrature amplitude modulation (QAM) jointly varying phase and amplitude. Additionally, the device supports advanced digital modulation methods like pulse-code modulation (PCM), differential PCM, adaptive DPCM, delta modulation, delta-sigma modulation, continuously variable slope delta modulation, and pulse-density modulation encoding data in pulse densities. By judiciously selecting from this comprehensive modulation toolkit and finely tuning parameters, the device achieves versatile poly-modulated waveform synthesis with precision control, enabling adaptability across diverse applications. The blend of analog and digital techniques combined with innovative engineering allows previously unattainable waveforms to be generated.

In the context of the invention detailed herein, we explore the mathematical foundations behind the device's waveform generation capabilities, which form the core innovation. The primary focus is on synthesizing poly-modulated waveforms by carefully manipulating various modulated pulse parameters denoted P1, P2, . . . , Pn. These are combined to produce diverse output waveforms W1, W2, . . . , Wm, expressed mathematically as:

$$sWi = f(P1, P2, \ldots, Pn), i = 1, 2, \ldots, m$$

The versatility arises from supporting multiple modulation techniques. Key methods include:

Amplitude Modulation (AM) varying the carrier amplitude A_c by the modulating signal A_m. This is defined as:

$$WAM(t) = A\_c \cdot \cos(2\pi f\_ct) \cdot (1 + k\_a \cdot A\_m \cdot \cos(2\pi f\_mt))$$

where f_c, f_m are the frequencies and k_a is the modulation index.

Phase-Shift Keying (PSK) utilizing phase shifts θ_1, . . . ,θ_I to encode data through:

$$WPSK(t) = A\_c \cdot \cos(2\pi f\_ct + \theta\_i)$$

with i indicating the phase.

Frequency-Shift Keying (FSK) shifting between frequencies f_1, . . . ,f_q as:

$$WFSK(t) = A\_c \cdot \cos(2\pi f\_it)$$

Amplitude-Shift Keying (ASK) modulating amplitudes A_1, . . . ,A_r through:

$$WASK(t) = A\_i \cdot \cos(2\pi f\_ct)$$

Quadrature Amplitude Modulation (QAM) combining phase and amplitude shifts. QAM signals are:

$$WQAM(t) = A\_i \cdot \cos(2\pi f\_ct + \theta\_i)$$

Pulse-Code Modulation (PCM) sampling and quantizing into levels A_i as:

$$WPCM(t) = \sum A\_i \cdot rect((t - iT\_s)/T\_s)$$

Differential PCM (DPCM) encoding sample differences through:

$$WDPCM(t) = WPCM(t) - WPCM(t - T\_s)$$

Adaptive DPCM (ADPCM) adapting the quantization levels based on signal characteristics and step size Δ.

Delta Modulation (DM) encoding differences as 1 or 0 based on the threshold.

Delta-Sigma Modulation (ΣΔ) using feedback loops and quantization noise shaping.

Continuously Variable Slope Delta Modulation (CVSDM) dynamically adjusting step size Δ.

Pulse-Density Modulation (PDM) modulating pulse density as:

$$WPDM = \sum \delta(t - t\_i)$$

The device involves generating poly-modulated waveforms by combining multiple modulated pulse parameters selected from digital, analog, and hybrid current output schemes. These are further modulated using techniques like amplitude modulation (AM), whereby the carrier signal's amplitude is systematically varied based on specific criteria. Additionally, advanced digital modulation techniques are leveraged including phase-shift keying (PSK) methods that encode data by shifting the carrier phase. Types of PSK schemes utilized include binary PSK (BPSK) with two phase states; quadrature PSK (QPSK) with four phase states encoding two bits per symbol; 8PSK and 16PSK with eight and 16 phase states respectively for higher data capacity; differential PSK (DPSK) and differential QPSK introducing phase differences between symbols to reduce transmission ambiguities; offset QPSK (OQPSK) offsetting phase transitions for spectral efficiency; and π/4-QPSK balancing spectral efficiency and ambiguity mitigation suited for wireless communications. The blend of analog and digital techniques provides versatile waveform generation capabilities.

The invention involves a device to generate poly-modulated waveforms by combining multiple modulated pulse parameters into digital, analog, or hybrid current outputs. Modulation schemes used include frequency-shift keying (FSK) varying the carrier frequency; audio FSK (AFSK) designed for audio signals; multi-frequency FSK (M-ary FSK) using multiple frequencies to represent data; dual-tone multi-frequency (DTMF) encoding voice and control signals onto waveforms; amplitude-shift keying (ASK) adjusting amplitude to convey data, often as on-off keying (OOK); and M-ary vestigial sideband modulation like 8VSB for digital TV broadcasting. Specifically, FSK, AFSK and MFSK modulate frequency, DTMF leverages dual-tone modulation, OOK modulates amplitude, and 8VSB utilizes vestigial sideband modulation. Additional phase-shift keying (PSK) methods described are binary PSK, quadrature PSK, differential PSK, offset QPSK, 8PSK, 16PSK, and TT/4-QPSK. The poly-modulation combines these diverse techniques by modulating multiple parameters simultaneously, enabling complex waveform generation with precision control over characteristics like frequency, amplitude and phase for adapting across applications.

This device generates poly-modulated waveforms by combining multiple modulated pulse parameters selected from digital, analog or hybrid current outputs. Mathematical modulation schemes used include: quadrature amplitude modulation (QAM) representing symbols with both amplitude (A) and phase (q) components; polar modulation, similar to QAM but separating phase shift keying (PSK) and amplitude shift keying (ASK); continuous phase modulation (CPM) methods defined by equations governing continuous phase variations over time; minimum-shift keying (MSK) known for its constant envelope and bandwidth efficiency; Gaussian MSK (GMSK) applying Gaussian filtering to MSK; continuous-phase frequency-shift keying (CPFSK) designed for smooth phase-continuous frequency transitions; orthogonal frequency-division multiplexing (OFDM) dividing bandwidth into subcarriers; and discrete multitone (DMT) modulation allowing adaptive subcarrier bit-loading. Specifically, QAM and polar modulation combine PSK and ASK, CPM maintains phase continuity, GMSK filters MSK, CPFSK enables efficient frequency shifting, OFDM parallels data transmission, and DMT adapts to channel conditions. Additional schemes may be integrated. This modulation versatility allows simultaneously controlling multiple parameters like phase, amplitude, and frequency to optimize waveforms for diverse applications.

The device generates poly-modulated waveforms by combining modulated pulse parameters into digital, analog or hybrid current outputs. Specific mathematical modulation techniques used include: wavelet modulation (WM) represented as a wavelet transform of the input signal x(t) using complex conjugate wavelet functions w(t); Trellis coded modulation (TCM) combining error-correcting codes and a mapping function f(S) to map the binary sequence S to the transmitted signal X; direct-sequence spread spectrum (DSSS) using a spreading function C(t) to spread the original signal X(t) across a wider bandwidth to get spread signal Y(t); chirp spread spectrum based on IEEE 802.15.4a standards employing pseudo-stochastic coding for efficient long-range communication and interference resistance; and frequency-hopping spread spectrum (FHSS) with a specialized channel release scheme hopping between frequency channels fi(t) based on a sequence H(i) added to the initial frequency f0 with increment Δf. Additionally, the poly-modulation allows simultaneously controlling multiple parameters like phase, amplitude and frequency to optimize waveforms for diverse applications.

The neuromodulation device incorporates a versatile pre-distortion technique to enhance the precision and efficacy of the electrical stimulation delivered to target neural structures. Key elements of this technique include: impedance compensation through real-time waveform shaping to accommodate tissue variations; scalp-to-cortex distance compensation to ensure consistent current density at the cortical level; real-time adjustment of waveform parameters based on physiological feedback to prevent over/under-stimulation; and waveform adaptation based on the individual's anatomical and physiological profile to align the stimulation with their neural architecture. Together, these adaptive mechanisms promote optimized, stable, uniform, and tailored neuromodulation to maximize therapeutic benefit.

1. Waveform Shaping Based on Impedance Compensation

The pre-distortion technique uses impedance compensation to account for the impedance (Z) encountered as current traverses through the scalp and skull to the cortex. Impedance is a complex quantity with resistance (R) and reactance (X) components, defined mathematically as:

$$Z = R + jX$$

where j represents the imaginary unit. For optimal current delivery, the device utilizes complex impedance matching, adjusting the phase and magnitude of the current waveform (I) to minimize the voltage drop across Z where V=I Z. This is achieved using a transfer function (H) relating desired current (Id) to actual current (Ia):

$$Ia = Id\, H$$

where H is a complex function of Z, providing amplitude and phase adjustments to maximize power transfer.

2. Compensation for Scalp-to-Cortex Distance

The scalp-to-cortex distance (d) affects current density (J) distribution in the brain, defined as J=I/A where I is the current and A is the area. As d increases, J decreases proportionally. The device uses mathematical models to adapt waveform parameters like amplitude and frequency to compensate for varying distances, ensuring consistent and effective stimulation.

3. Real-Time Adjustment of Waveform Parameters

In the context of real-time adjustment of waveform parameters, the device employs sophisticated mathematical control systems to dynamically adapt the stimulation waveform based on physiological feedback, particularly from EEG/tES measurements. This real-time control process can be represented mathematically as a feedback control loop, where the goal is to continuously optimize the waveform parameters for effective transcranial electrical stimulation.

A. Feedback Control Loop

The real-time adjustment uses a feedback control loop represented mathematically using control theory. The desired waveform is Wd(t) and the actual waveform produced is Wa(t). The error signal E(t) at time t is defined as:

$$E(t) = Wd(t) - Wa(t)$$

The goal is to minimize this error by adjusting waveform parameters.

B. Transfer Functions

Transfer functions G(s) characterize the system's response to input changes, where s is the complex Laplace variable. It is defined as:

$$G(s) = Wa(s)/Wd(s)$$

relating the actual Wa(s) and desired Wd(s) waveforms in the frequency domain.

C. Controller Design

A proportional-integral-derivative (PID) controller is commonly used to calculate necessary waveform parameter adjustments. Its output U(t) is:

$$U(t) = Kp \cdot E(t) + Ki \cdot \int E(t)dt + Kd \cdot dE(t)/dt$$

where Kp, Ki, Kd are tuned gains.

4. Adjustment of Stimulation Parameters

The controller output U(t) represents the adjustments needed, involving parameters like frequency, phase and amplitude depending on the stimulation mechanism. The relationship between' U(t) and actual adjustments depends on the device specifics.

5. Adaptation of Waveform Characteristics to Individual Anatomical-Physiological Variations Mathematical modeling enables precise customization of waveforms based on a user's anatomical (A) and physiological (P) characteristics:

A. Regression Analysis

Linear regression establishes relationships between features and optimal parameters. The model is:

$$Y = \beta 0 + \beta 1 A + \beta 2 P + \varepsilon$$

where Y is the desired waveform characteristic, β0 is the intercept, β1 and β2 are regressor coefficients, and ε is error. By analyzing user data, the device calculates coefficients predicting optimal parameters for new users.

B. Optimization Algorithms

Algorithms like gradient descent fine-tune parameters by minimizing an objective function J (0) representing the discrepancy between predicted and desired characteristics:

$$J(\theta) = \sum (Yi - f(\theta, Ai, Pi))2$$

where θ denotes the optimized parameters, Yi is the desired characteristic for user i, and f (θ, Ai, Pi) is the regression prediction. Gradient descent iteratively updates θ toward the minimum J(θ).

C. Data-Driven Approaches

Machine learning techniques like decision trees and neural networks can also directly learn relationships between features and characteristics. This enables flexible, adaptive customization.

In the context of the patent application for transcranial electrical stimulation, the device offers a remarkable range of pulse-parameter settings that are pivotal in tailoring the efficacy and safety of the stimulation. These parameters encompass a spectrum of options for delivering current stimulation, including digital, analog, and hybrid output modes. Let's delve into the mathematical intricacies of these parameters to appreciate their significance in optimizing transcranial electrical stimulation protocols.

Firstly, we have the Pulse Amplitude (A), denoted as 'A,' which quantifies the strength of the current delivered during each pulse. It can be finely adjusted, ranging from a minimum of 0 mA (signifying no stimulation) to a maximum of 8 mA, offering a versatile 0≤A≤8 mA amplitude range. Next, the Pulse Duration (T), represented as 'T,' signifies the duration for which each pulse remains active. This duration can be customized to suit specific requirements, ranging from instantaneous (0 seconds) to a maximum of 60 seconds, defined as 0≤T≤60 seconds. The Total Stimulation Session Duration(S), parameterized as 'S,' plays a crucial role in managing the overall session time. It can be set within the span of 0 minutes (indicating no session) to a maximum of 60 minutes, as articulated by 0≤S≤60 minutes. For controlling the frequency of pulses, the Pulse Frequency (f), denoted as 'f,' offers a wide range of options measured in Hertz (Hz). Users can fine-tune this parameter, adjusting it from a minimum of 0 Hz (no pulsing) to a maximum of 100,000 Hz, expressed as 0≤f≤100,000 Hz. The Pulse Polarity Switch Frequency (fp), represented as 'fp,' specifies the frequency at which the polarity of the pulses switches. It varies from 0 Hz (no polarity switching) to a maximum of 1000 Hz, providing flexibility with a range defined as 0≤fp≤1000 Hz.

Moreover, the Inter-Pulse Interval (IPI), denoted as 'IPI,' determines the time gap between successive pulses within a pulse train. This interval is customizable, spanning from continuous pulses (0 seconds) to a maximum of 60 seconds, adhering to the range 0≤IPI≤60 seconds. The Intra-Pulse Interval (IntraPI), parameterized as 'IntraPI,' specifies the modulation time within an individual pulse. It can be adjusted between no modulation (0 seconds) to a maximum of 60 seconds, encompassing the range 0≤ IntraPI≤60 seconds. For assessing the pulse shape, the Pulse Rise Time (Rise) signifies the duration it takes for the pulse to transition from 10% to 90% of its maximum amplitude. It can be fine-tuned within the span of 0 seconds to a maximum of 1 second, with a range defined as 0≤Rise≤1 second. Conversely, the Pulse Fall Time (Fall), denoted as 'Fall,' specifies the time taken for the pulse to transition from 90% to 10% of its maximum amplitude. Users can customize this parameter from 0 seconds to a maximum of 1 second, adhering to the range 0≤Fall≤1 second. The Pulse Duty Cycle (DC), which is represented as 'DC,' quantifies the ratio of the pulse duration to the total pulse train duration, expressed as a percentage. It is adjustable across a spectrum, ranging from no active pulse (0%) to continuous active pulse (100%), as defined by 0%≤DC≤100%. Additionally, the Pulse Ramp (Ramp) parameter, denoted as 'Ramp,' indicates the time it takes for the pulse amplitude to rise from 10% to 90% of its maximum value at the beginning of each pulse. This duration can be fine-tuned, spanning from 0 seconds to a maximum of 60 seconds, within the range 0≤Ramp≤60 seconds. The Pulse Offset (Offset), parameterized as 'Offset,' signifies the delay before initiating the pulse train within the stimulation session. Users can set this delay from 0 minutes (no offset) to a maximum of 60 minutes, adhering to the range 0≤Offset≤60 minutes. Lastly, the Pulse Train Duration (PTD), representing 'PTD,' specifies the total time during which the pulse train is active within the stimulation session. It is adjustable from no pulse train (0 minutes) to a maximum of 60 minutes, encompassing the range $0 \leq PTD \leq 60$ minutes.

The device has Bluetooth integration to enable wireless pairing with external platforms for enhanced functionality. Notably, the Bluetooth-enabled base circuit can dynamically adjust stimulation parameters in real-time based on neural feedback acquired through integrated sensors. This closed-loop feedback system processes signals to analyze neural response characteristics, then intelligently modifies parameters like waveform shape to optimize the neuromodulation effect. Key advantages include improved treatment outcomes, user-friendliness, and adaptability to tailor interventions to individual needs across therapy, enhancement, and research.

The neuromodulation device harnesses real-time data from a diverse array of Internet of Medical Things (IoMT) sources including wearables, remote monitors, medical apps/devices, and telemedicine equipment. This facilitates the device's ability to tailor stimulation parameters in response to specific health/wellness metrics from these interconnected sources. For example, data on heart rate, blood glucose levels, oxygen saturation, and more allows the device to modulate waveform timing/intensity to optimize therapy safety/efficacy as the patient's condition evolves. The integration with telemedicine also enables remote adjustment by providers. Overall, this interconnected ecosystem ensures personalized, responsive neuromodulation aligned to the patient's individual needs and changing health status.

The advanced neuromodulation device uses Electrical Impedance Tomography (EIT) with multiple frequencies to enable real-time monitoring of physiological changes and impedance variations in brain tissues. EIT involves applying electrical currents and measuring voltage changes via scalp electrodes to assess tissue conductivity. By analyzing the impedance data across different frequencies, the device obtains comprehensive information on parameters like blood flow, cellular activity, and functional responses. This allows for dynamic adaptation of the transcranial electrical stimulation in real time to optimize and tailor the neuromodulation effect to the individual's physiological state. The integration of EIT and multi-frequency impedance tracking enhances specificity, safety and efficacy.

The device leverages the concept of electrical impedance (Z), which relates voltage and current in tissues, to enable real-time physiological monitoring. By measuring impedance magnitude ($|Z(f)|$) and phase ($\varphi(f)$) at multiple frequencies (f1, f2, ..., fn), the device creates a frequency-dependent impedance spectrum. Tracking impedance variations ($\Delta|Z(f)|$, $\Delta\varphi(f)$) across this spectrum allows for mathematical characterization of dynamic changes in blood flow, cellular activity, and brain function. This multi-frequency impedance tracking provides the basis for comprehensively assessing tissue property alterations underlying physiological processes in real-time.

The highly versatile neuromodulation device can deliver various stimulation modalities over time, providing an expansive toolkit to address neurological and psychiatric conditions. Key modalities include photobiomodulation therapies across the light spectrum, transcranial stimulation techniques (TMS, tDCS, tRNS, tPCS, tACS), transcutaneous and vagus nerve stimulation, spinal cord stimulation, optogenetics, and pulsed electromagnetic field therapy. This multi-modal capacity equips the device to precisely modulate neuronal activity through different mechanisms like altering cortical excitability, entraining brain oscillations, inducing plasticity, and influencing cellular processes. The stimulation versatility enhances the scope of therapeutic applications.

The technique introduces an innovative method to optimize neuromodulation by strategically modulating voltage gradient geometries using advanced mathematical concepts. Key elements include defining voltage gradient vectors and geometry transformation matrices to characterize electric field distributions; leveraging principles like maximizing electric field magnitude within neural targets and applying Green's functions to encode boundary conditions; employing finite element analysis to model voltage gradients by numerically solving PDEs; and utilizing optimization algorithms, notably gradient descent, to iteratively adjust geometry parameters to achieve optimized stimulation. Together, these mathematical frameworks allow for adaptable modulation of endogenous or exogenous voltage gradients to enhance precision in aligning electric field patterns to the target neural morphology for improved neuromodulation outcomes.

The algorithm trains neural ordinary differential equations (NODEs) or neural network differential equations (NDDEs) by iteratively optimizing model parameters to improve prediction of trajectories. It samples batch trajectories and initial points from training data, solves differential equations using the parameters via an ODE solver to generate trajectories, computes loss between predictions and ground truth, updates parameters by gradient descent, and prunes parameters by magnitude. Mathematical details include quantifying sample and batch sizes, representing the ODE system and solver formally, formally defining the loss function, and expressing the parameter update rule. The iterative process aims to minimize prediction error by tuning parameters to best capture the dynamics embodied in the differential equations and training data.

The transcranial electrical stimulation device is designed to treat diverse neurological disorders including Parkinson's, Alzheimer's, epilepsy, stroke, MS, ALS, and more. It operates by targeted electrical stimulation of specific brain regions to modulate neural activity, correct neurotransmitter imbalance, and promote neuroplasticity. Crucially, it incorporates real-time biomarker monitoring, including abnormal protein aggregates, seizures, lesions, genetics, cerebral blood flow changes, structural damage, neurotransmitter levels, nerve signaling, etc. This allows personalized, adaptive treatment tailored to each patient's responses, enhancing outcomes. By combining neuromodulation with data-driven biomarker feedback on disease progression and treatment response, the invention enables significant advances in understanding and treating debilitating neurological conditions through a versatile, precision-targeted approach.

Hierarchical Referencing

Hierarchical referencing is a proposed information-theoretic mechanism for improving the spatial resolution of electroencephalography (EEG) sensing while reducing circuit power and volume. The basic idea is to exploit the decay of high-spatial frequencies during volume conduction from electrical sources in the brain to the electrodes on the scalp, and the induced high local spatial correlations, to reduce the required circuit power and volume. The hierarchical referencing scheme involves dividing the electrodes into multiple levels, with each level referencing the previous level. The lowest level references the scalp, while the highest level references a common mode signal. The intermediate levels reference a combination of the previous level and the scalp. This hierarchical referencing strategy exploits the fact that the high-spatial frequency components of the EEG/tES signals decay rapidly with distance from the source, while the low-spatial frequency components are more stable. The theoretical analysis of hierarchical referencing shows that it can significantly reduce the number of bits required for analog-to-digital conversion (ADC) of the EEG/tES signals. Based on extrapolation of data recorded from a low-density system, it is estimated that on average, 3 bits of ADC can be saved for each electrode. In ultra high-density EEGs with electrode spacing of ~3 mm, bit savings of 2-3 bits add up when it is employed at the lower end of a tree which comprises 80-90% of all electrodes. Experimental results using human EEG/tES data validate the theoretical inter-electrode correlations and bit savings when employing a hierarchical referencing strategy. Extrapolating from electrodes that are at least 2 cm apart, it is observed that on average savings can exceed 3 bits per electrode at inter-electrode distances of 3 mm. The proposed hierarchical referencing scheme has important implications for improving source-localization accuracy in ultra high-density EEG/tES sensing. It enables higher resolution EEG/tES systems, thereby reducing the need for expensive and bulky magnetoencephalography (MEG) systems. However, the implementation of hierarchical referencing is hindered by constraints in circuit volume and energy consumption. Therefore, further research is needed to develop practical and efficient hierarchical referencing schemes for ultra high-density EEG/tES sensing.

The math behind hierarchical referencing involves quantifying the correlation between the EEG/tES signals recorded at different electrodes. The proposed hierarchical referencing mechanism arranges sensors in a tree configuration, with each sensor at a lower level referenced against a sensor (in close proximity) at one level higher. The lower level electrodes share higher order bits due to large correlation with the immediately higher level. Thus the difference signal has lower bit requirements. This allows for the use of low-resolution analog-to-digital converters (ADCs) at the lower levels, which reduces their energy consumption and circuit volume. The required number of bits for quantizing the difference (X1–X0) between two signals X1 and X0 can be expressed as: bits=log 2 $(1+(\sigma^2/p^2)/qe)$ where $\sigma^2$ is the variance of signal X1 and X0, p is the Pearson's correlation between X1 and X0, and qe is the quantization error. It is clear from this expression that the required number of bits reduces as p increases and is less than the number of bits needed to quantize signal X1 as long as p is greater than 0.5. In hierarchical referencing, the correlation between the signals at different levels is exploited to reduce the number of bits required for quantization. The lower level signals are quantized with fewer bits than the higher level signals, since they are correlated with the higher level signals. This reduces the overall number of bits required for quantization, which in turn reduces the energy consumption and circuit volume of the ADCs. The hierarchical referencing scheme can be optimized by adjusting the number of levels and the correlation between the signals at each level, based on the specific requirements of the EEG/tES sensing system.

While hierarchical referencing has the potential to improve the spatial resolution of EEG/tES sensing while reducing circuit power and volume, there are several limitations to its implementation. One limitation is the need for a large number of electrodes to achieve high spatial resolution. The hierarchical referencing scheme requires a large number of electrodes to be arranged in a tree configuration, with each electrode referencing the previous level. This can be challenging to implement in practice, especially for ultra high-density EEG/tES systems with electrode spacing of ~3 mm. Another limitation is the need for high-quality reference signals. The hierarchical referencing scheme relies on the correlation between the signals at different levels to reduce the number of bits required for quantization. This requires high-quality reference signals at each level, which can be difficult to obtain in practice due to noise and other sources of interference. The implementation of hierarchical referencing is also hindered by constraints in circuit volume and energy consumption. The use of low-resolution ADCs at the lower levels reduces their energy consumption and circuit volume, but this can lead to reduced signal quality and accuracy. Finally, the theoretical analysis of hierarchical referencing assumes that the EEG/tES signals are stationary and Gaussian. In practice, the EEG/tES signals can be non-stationary and non-Gaussian, which can affect the performance of hierarchical referencing. Overall, while hierarchical referencing has the potential to improve the spatial resolution of EEG/tES sensing while reducing circuit power and volume, further research is needed to develop practical and efficient hierarchical referencing schemes that can overcome these limitations.

The hierarchical referencing scheme involves computing the voltage difference between each electrode and a nearby reference electrode (V1), and then computing the voltage difference between each reference electrode and a global reference electrode (V2). The voltage difference between each electrode and the global reference electrode (VO) is then given by: V=V1+V2+VO The quantized values obtained by the ADCs are denoted by Yi, where i is the index of the electrode. The amplified and quantized values are denoted by Yi', and the voltage difference between each electrode and the global reference electrode is denoted by Vi. The relationship between these quantities is given by: Yi'=Ai (Yi-Vi) where Ai is the amplification factor for electrode i. The spherical harmonic functions used to compute the coefficients of the biopotential signals are denoted by Ylm($\theta,\varphi$), where l is the order of the function and m is the degree of the function. The coefficients themselves are denoted by Clm, and are given by: Clm=$\Sigma$i Ai Yi' Ylm($\theta$i, $\varphi$i) where the sum is taken over all electrodes i, and $\theta$i and $\varphi$i are the polar and azimuthal angles of electrode i, respectively. The energy of the biopotential signals summed over all orders of the spherical harmonic functions is denoted by E, and is given by: E=$\Sigma$l$\Sigma$m|Clm|$^2$ where the sum is taken over all orders l and degrees m of the spherical harmonic functions. These equations and others in the patent describe the complex mathematical framework that underlies the system and method for hierarchical referencing in biopotential measurements.

To address the limitations inherent in the current implementation of hierarchical referencing for EEG/tES sensing, several innovative strategies can be considered, with a focus on mathematical enhancements and circuitry improvements.

1. Electrode Optimization: To mitigate the challenge of requiring a large number of electrodes for high spatial resolution, we can explore advanced electrode designs based on mathematical principles. Optimization algorithms, such as genetic algorithms or simulated annealing, can be employed to determine the optimal electrode positions within physical constraints. This optimization process can be formulated as a mathematical optimization problem, where the objective function seeks to maximize spatial resolution while adhering to limitations like electrode spacing.

2. Signal Quality Enhancement: To ensure high-quality reference signals, advanced signal processing techniques can be employed. Mathematical denoising algorithms, such as wavelet denoising or Kalman filtering, can be applied to the reference signals. These algorithms utilize mathematical models to distinguish signal from noise, thereby improving the accuracy of hierarchical referencing. Moreover, adaptive filtering techniques can be incorporated to dynamically adjust reference signals in real-time, considering variations due to noise and interference.

3. Energy-efficient Circuitry: To address constraints in circuit volume and energy consumption, mathematical modeling of circuit components can lead to optimized designs. The use of low-resolution ADCs can be balanced with advanced compression techniques, such as compressed sensing, which mathematically reconstruct EEG/tES signals from sub-sampled data, minimizing energy consumption while maintaining signal fidelity. Furthermore, mathematical modeling of power consumption profiles can guide the selection of energy-efficient components and circuit topologies, minimizing power requirements.

4. Non-Stationary EEG/tES Signals: To accommodate non-stationary and non-Gaussian EEG/tES signals, advanced statistical methods can be incorporated into the hierarchical referencing framework. Time-varying modeling techniques, like autoregressive integrated moving average (ARIMA) models, can capture the temporal dynamics of EEG/tES signals, allowing hierarchical referencing to adapt in real-time. Additionally, robust hierarchical referencing algorithms can be developed that are less sensitive to deviations from Gaussianity by utilizing heavy-tailed distributions or robust statistical estimators.

Damped Randomized Frequency Modulation

Figure 3:
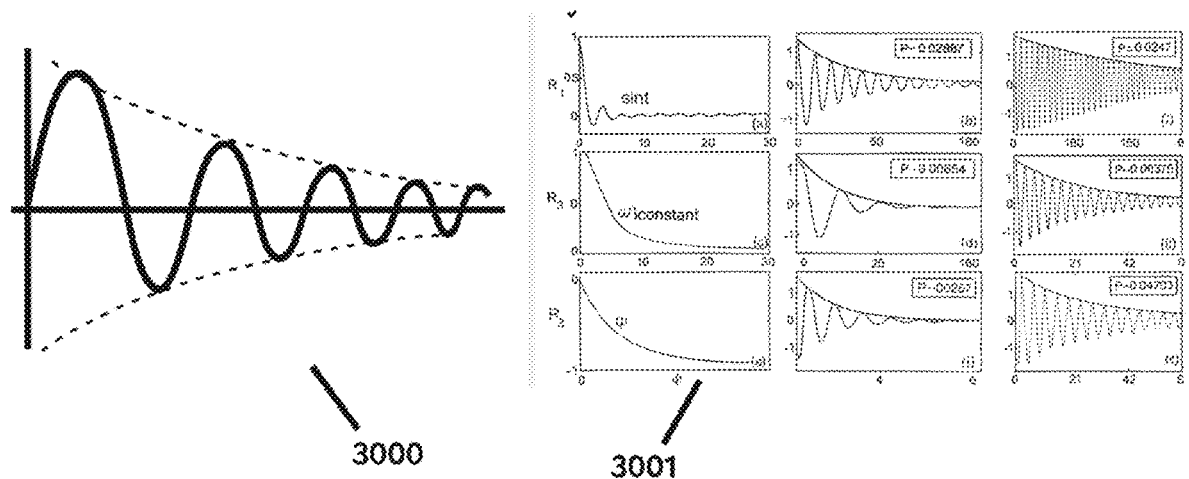
FIG. 3 is a scientific figure illustrating damping modulation for cross frequency recruitment and entrainment with various waveforms and graphs.

Another novel technique, introduced in FIG. 3, is a damped randomized frequency modulation 3000 is implemented to assist with entrainment of endogenous neural oscillations 3001. By harnessing mathematical principles of attraction and stability, the stimulation pulses converge towards targeted rhythms linked to therapeutic brainwave bands. This facilitates precision resonance while preventing habituation.

The instantaneous frequency f(t) is defined as:

$$f(t) = fe + A \cdot e - \delta t \cdot \cos(\omega t) \cdot R(t)$$

where:
fe=Target entrainment frequency
A=Amplitude of the damped oscillator
δ=Damping coefficient
ω=Angular frequency
R(t)=Random variable ranging from −1 to 1

The cosine term with angular frequency ω creates an oscillatory profile around the entrainment frequency fe, while the exponential envelope applies the damping modulation that gradually pulls f(t) towards fe. The R(t) term introduces bounded randomness to create short-term variability preventing accommodation while retaining attraction to fe.

By tuning parameters like fe, δ, and ω, the waveform can be tailored to match and modulate specific endogenous frequency bands through this stochastically stabilized mechanism.

The damped frequency modulation leverages mathematical modeling of dynamic systems to harness intrinsic physiological resonances. This promises to enhance selective neural activation for specialized applications.

The key idea is that the stimulation frequency over time is randomly varied and converges towards a specific target frequency value. This is achieved by applying a mathematical damping modulation. In signal processing terms, the stimulation frequency f(t) has a damping constant applied to produce an exponential decaying oscillatory behavior. As f(t) varies randomly at each time step, it is slowly pulled towards the target entrainment frequency fe over subsequent timesteps. This creates a modulated frequency profile that behaves somewhat erratically, exploring a range of values in a neighborhood around fe. But a damping envelope gradually pulls the signal towards fe. From a neurophysiology perspective, this introduces slight variability into the timing of pulses so that the oscillations activated have a natural attraction towards endogenous rhythms of interest, such as sensory or cognitive processes linked to specific frequency bands. The continuously adapting damped frequency modulation harnesses mathematical principles of stability and attraction towards setpoints to harness intrinsic neural resonances for therapeutic effects.

Chaotic Frequency Hopping

The stimulation frequency unpredictably hops between values generated from different chaotic maps like the Logistic, Henon, Lorenz or Rossler systems. This leverages mathematical chaos to enable exploration without repetition.

1. Markov-chain frequency switching—The stimulation frequency varies by transitioning between different values based on a Markov chain model defining transitional probabilities between defined states. This allows controlled stationarity amidst randomness.

2. Multi-harmonic frequency resonance—Fundamental and harmonic frequencies resonate in certain ratios leading to periodic convergence/divergence mimicking stochasticity. Leverages dynamical systems effects.

3. Noise resonance pumping—Low-level noise disrupts monotonic adaptation allowing trajectories to continually resample stimulation space. Based on stochastic resonance principles.

4. Evolutionary frequency walks—The stimulation frequency takes a random walk with increments drawn from evolutionary-algorithm based probability distributions to perform heuristic search.

5. Entropy-maximization sampling—Selecting sequential frequencies to maximize entropy leads to uniform coverage without localization akin to Monte Carlo approaches.

6. Fractal frequency sets—Stimulation frequencies are selected from structurally self-similar frequency set structures that provide variability across scale.

7. Chaotic resonance hopping—Chaotic dynamical systems used to modulate stimulation frequencies to hop between intrinsic system resonances for optimized disruption.

Here are some key statistical distributions that can be leveraged to randomly vary the stimulation frequencies over different profiles:

1. Triangular Distribution: Offers simplicity with a peaked density function defined by a minimum, maximum and modal value. Allows tuning the extent and skew.

2. Pyramidal Distribution: Has a high narrow center peak that linearly declines symmetrically on both sides modeling accumulation around a central setpoint.

3. Gapped Distribution: Similar to pyramidal but with a zero-density region between the telemonitoring modal spike and tails to create separation between domains.

4. Uniform Distribution: Where all values in a bounded interval have equal probability density resulting in an unbiased flat profile
5. Inverse Square Root Distribution: Density spikes towards extreme values while symmetrically declining towards the median with less occupancy in the center.
6. Normal Distribution: The iconic bell curve shape with symmetry around the mean highlighting a tendency for proximal clustering.
7. Geometric Distribution: Models waiting times between discrete events like failures with a sharply decreasing probability for longer waits.
8. Exponential Distribution: Describes the time between Poisson random events with shorter intervals being more likely.
9. Gamma Distribution: Governs waiting times similar to exponential but also models contagious processes with temporal correlations.
10. Beta Distribution: Defined between bounded limits 0 and 1 allowing flexibility in asymmetry to skew towards extremes or center.

Together these probability distributions, sampled randomly using generators, enable crafting frequency modulations over diverse profiles spanning peaked, flat, skewed, reciprocal or clustered tendencies. This further enhances the capacity to avoid physiological accommodation while exploring neural responses through tailored uncertainty injection. Personalizing randomized neurostimulation parameters over longitudinal timescales enables unprecedented patient-specific tuning catering to disease evolution. By modeling probability distribution shapes and properties from triangular to gamma as mathematical functions, variability can be selectively incorporated into amplitude, pulse width and other traits over days to years.

Crucially, each distribution's unique characteristics are captured by parameters like skew, kurtosis, mean, variance etc. Disease biomarkers and symptom profiles guide data-driven shaping, range tuning and sampling of distributions for a patient. As presentations transform, distribution parameters coevolve, maintaining optimal uncertainty for plasticity. Capturing patient heterogeneity this way maximizes outcomes. For instance, bimodal beta distributions allow grouping low and high amplitude responses for an individual. Preemptive high kurtosis, narrow gamma distributions deliver high intensity samples during episodic presentations. Broad, uniform sampling then consolidates gains. Exponential decay distributions strategically sample acute therapeutic windows more initially, then taper. Finally, stochastic differential equation models seamlessly integrate distributional variability over both fast and slow timescales—from pulse-to-pulse to lifespan neuromodulation.

In navigating the landscape of clinical neuromodulation treatment, a comprehensive understanding of dose-response relationships and pertinent variables is paramount for optimizing stimulation parameters. The dose-response curve assumes various shapes, ranging from linear, where therapeutic response aligns proportionally with stimulation dose, to saturation, indicating a gradual waning of benefits at higher intensities. Sigmoidal curves hint at cooperative binding mechanisms, while biphasic patterns show effectiveness at low and high doses with an intermediate range of diminished efficacy. The hormetic curve unveils the paradox where low doses prove beneficial, while high doses become detrimental. Independent variables crucial to this optimization include stimulation intensity (in terms of current amplitude, voltage, and frequency), pulse width (the duration of an individual pulse), burst pattern (encompassing grouping, frequency, and rhythm of pulses), polarity (reflecting the relative positive/negative amplitude of phases), and electrode montage (including the number, relative polarity, and position of electrodes).

On the other side of the equation are dependent outcome variables that serve as critical gauges for the effectiveness of neuromodulation. These include clinical rating scale scores, behavioral and physiological biomarkers (such as EEG, EMG, and functional imaging), molecular biomarkers, side-effect/toxicity measures, relapse rates, and activity/participation metrics. Bridging these variables are various statistical modeling approaches, from regression models that correlate independent variables to outcomes, to pharmacokinetic/pharmacodynamic models that translate dosing into effects, and systems biology models that establish mechanistic links between variables and responses. The integration of these modeling approaches across different modalities allows for the development of customized models, paving the way for the identification of optimized, individualized protocols that maximize therapeutic benefit.

1. Linear dose-response: The simplest case where therapeutic efficacy scales proportionally with stimulation intensity following $y=mx+c$. However, limitations exist on permissible amplitude.
2. Sigmoidal curve: An S-shaped response modelled by the logistic function with upper/lower asymptotes. Indicates cooperative physiological mechanisms with accelerating then diminishing returns.
3. Biphasic Relationships: Low and high stimulation evokes responses but intermediate intensities fail to trigger effects suggesting dual-process activation. Models incorporate polynomial terms.
4. Hormetic dose-response: Low intensity elicits benefit but becomes detrimental at higher intensities indicating homeostatic overcompensation. Mathematical descriptions add negative quadratic exponents.
5. Multimodal response: Multiple distinct peaks in therapeutic Windows suggest triggering of diverse mechanisms. Modeled using multivariate kernel density estimators.
6. Oscillatory dose-dependencies: Resonances at specific amplitudes reveals periodic physiological phenomena. Captured through sinusoidal models.
7. Bipolar dose-effect: Positive and negative symptom scores display opposite trajectories revealing shifts in excitation/inhibition balance.
8. Multidimensional response surfaces: Combinatorial parameter sweeps reveal interactions spanning current, frequency, pulse width and beyond requiring n-dimensional surface fitting.
9. Time-varying adaptations: Chronaxie, threshold variations with repetitive stimulation reveal short/long term plasticity embodied in dynamical state-space models.
10. Stochastic trajectories: Incorporating randomness handles inter/intra-individual variability improving outcome reliability.

Here are some key elements introducing dynamic network state modeling and modulation concepts for the patent application:

The innovation proposes a paradigm shift in analyzing and modulating brain activity-leveraging mathematical principles from statistical mechanics and dynamical systems theory to evaluate transitions between distinct brain network configurations associated with varying cognitive and behavioral states. Specifically, multi-dimensional energy landscape models are constructed to represent brain network dynamics, where valleys signify stable connectivity patterns and peaks denote transitional phases requiring heightened neural coordination to switch states. Each brain network such as default mode, dorsal attention, salience and visual systems are modeled as attractors-self-reinforcing activation profiles.

The metaphorical 'energy thresholds' quantify the stimulation effort required to forcibly switch network states away from an attractor. By analyzing landscape features including barrier heights and transition pathways, the system identifies optimal stimulation protocols to modulate network activations. Additionally, minimum energy trajectory analysis reveals the most efficient state transition trajectories by incorporating connectivity constraints, synchronization demands and neural inertia. Through this physics-inspired lens, core dynamical principles underlying network switching are discovered to devise precise manipulation strategies.

The innovation ultimately allows tailored stimulation waveforms to guide transitions into target brain system configurations most congruent to desired cognitive/behavioral states. This offers the potential to remedy impairments, enhance skills and treat neurological disorders through network control—a fundamentally new perspective harnessing tools from mathematics and physics.

The revised amplitude-modulated random noise transcranial stimulation protocol incorporates pulse widths between 5-15 us with inter-pulse intervals varying from 0.5-10 ms and duty cycles of 2.5-5 s modulated per polarity over 15 minutes sessions. The ultrashort pulse widths facilitate precise temporal targeting of fast glutamatergic dynamics that become dysregulated in Alzheimer's and frontotemporal dementias, resulting in subcortical hyperactivity and cortical hypometabolism. The brief pulses synchronize to gamma and high frequency oscillations.

Concurrently, the variable train duration introduces uncertainty to counter beta band hypersynchrony while providing extended resonance windows necessary for kindling distributed cell assemblies across premotor and prefrontal areas to reinforce goal-oriented sequencing damaged in planning deficits. The short inter-pulse intervals combined with variability combat habituation allowing for penetration across calcium dynamics timescales. The current waveforms may recalibrate Ca2+influx disrupted in long-term depression underlying several dementia synaptic signaling deficiencies that accelerate cognitive decline. Additionally, the intermittent duty cycles prevent pathological entrainment linked to default mode and ventral attention network over-coordination in AD. The dataset variability challenges frontal midline theta rhythm abnormalities associated with memory retrieval and executive functioning lapses that characterize early dementia progression.

Overall, by targeting fast neurotransmitter actions, calcium signaling, and pathological synchrony traits through precise temporal neuromodulation that introduces variability atop dysfunction, the protocol attempts to revive plastic processes that sustain in prefrontal circuits early in neurodegenerative processes. The concept of utilizing ultrafast pulses within the brain hinges on leveraging the inherent time integrity constant of neurons, typically ranging between 5 to 20 milliseconds. The objective is to strategically exploit this temporal window to summate voltage gradients induced by rapid pulses. By aligning the timing of these ultrafast pulses, a synchronized effect is achieved, leading to the generation of a larger, temporally summated voltage gradient. This concerted approach is designed to attain the necessary voltage levels for specific neurophysiological effects, such as hyperpolarization or depolarization of neurons.

Crucially, the methodology is implemented in a noninvasive manner, implying that the manipulation of neuron activity occurs without the need for invasive procedures. Instead, the focus is on precisely timing ultrafast pulses to capitalize on the neuron's time integrity constant. This strategy aims to exploit the natural temporal characteristics of neurons, optimizing the effectiveness of the stimulation process. In essence, by strategically aligning ultrafast pulses to coincide within the neuron's specified time frame, the approach seeks to induce a substantial voltage gradient, thereby influencing the neuron's state in a targeted and noninvasive manner.

Dynamic Electrode Array

Figure 4:
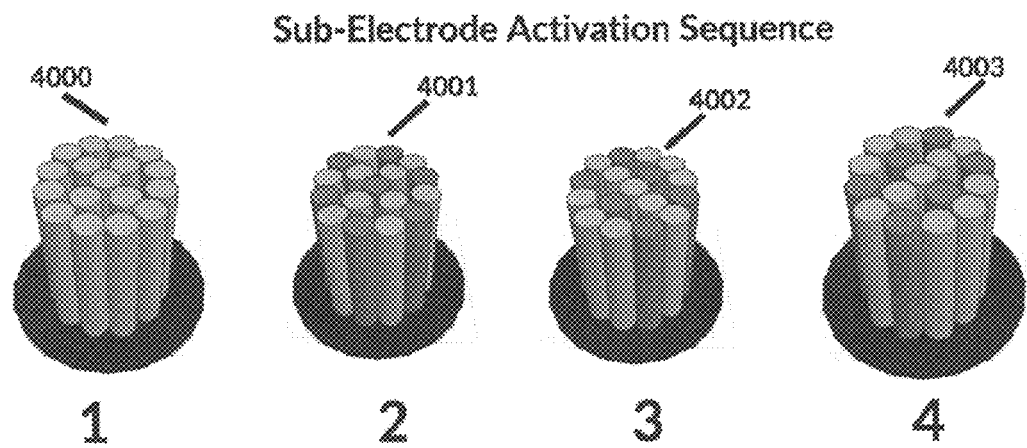
FIG. 4 depicts a four-step sub-electrode activation sequence, with each step showing various numbers of activated electrodes.

The present invention pertains to a neuromodulation device that incorporates a dynamic electrode array, as shown in FIG. 4, with the capability of fine-tuning electrode sensor groups through a series of actions 4000. These actions are selected from a comprehensive set of sequencing possibilities, which include firing, switching, grouping, grounding, and deactivating sub-electrode contacts within a highly configurable sub-electrode contact network 4001. The sequence of the subtle lecture activation is modulated overtime to be optimized towards the best sub-electrode network activation through randomization 4002 or through a predetermined search. The primary objective of these actions is to effectuate modifications to one or multiple characteristics associated with the voltage-gradient geometry that is being delivered through the sub-electrode contact network. Specifically, the changes pertain to the shape, orientation, and position of the voltage-gradient geometry. The dynamic electrode array enables customizable neuromodulation through sub-electrode firing, switching between contacts, grouping into synergistic clusters 4003, and grounding/deactivation to selectively adapt voltage-gradient geometry over time. This allows precision-tailoring of signals to modulate specific neural circuits and maintain optimal therapeutic efficacy as neural patterns change.

Example of Dynamic Array

The mathematical model consists of a dynamic electrode array E with N discrete electrodes indexed from 1 to N. Each electrode i has a set of sub-electrode contacts $C_i$ that can be individually manipulated. The state of contact j in $C_i$ is represented by a binary variable $x_{ij}$, equal to 1 if active and 0 if inactive. The actions on each contact j include: firing (activating) the contact by setting $x_{ij}=1$; switching between contacts on the same electrode by toggling $x_{ij}$ and $x_{ik}$ between 0 and 1; grouping contacts into clusters by partitioning $C_i$ into subsets; grounding (deactivating) by setting $x_{ij}=0$; and complete deactivation with $x_{ij}=0$. The goal is to optimize the sensor groups to modify the shape(S), orientation (O) and position (P) of the voltage gradient geometry, represented as functions of $x_{ij}$ and neuromodulation parameters. The optimization problem is to maximize/minimize an objective M (S, O, P, $x_{ij}$) subject to k constraints $g_i$ (S, O, P, $x_{ij}$)$\leq 0$ representing tissue conductivity, current density and patient factors. The algorithm finds the $x_{ij}$ values that optimize M while satisfying the constraints The device employs an array of sub-electrodes that enables advanced modulation and monitoring of neural activity. Individual or selected groups of sub-electrodes can be activated in customizable sequences to target specific brain region shapes with greater precision. For transcranial electrical stimulation, current is delivered through particular sub-electrode combinations to steer the electric field, focusing neuromodulation on desired neural tissue while minimizing off-target effects.

Figure 5:
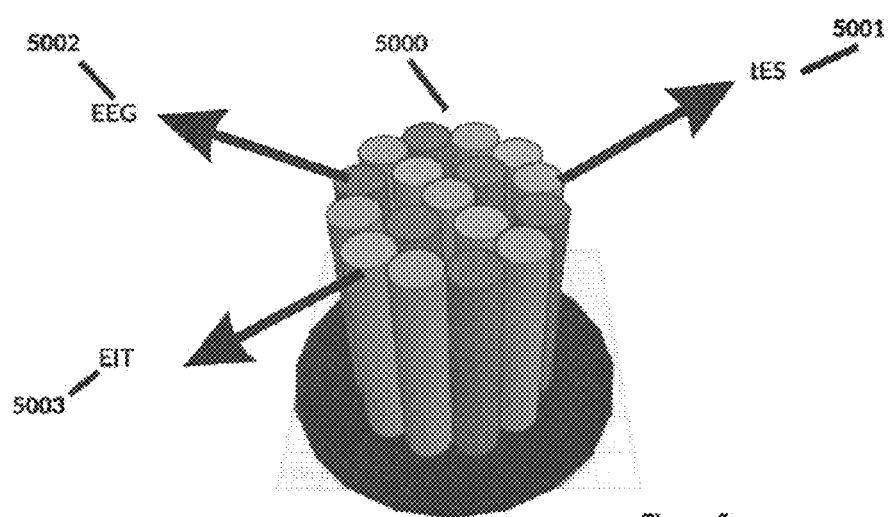
FIG. 5 depicts sub-electrode activation with various types of modalities on each sub-electrodes: transcranial electrical stimulation (tES), electrical impedance tomography (EIT), and electroencephalogram (EEG)

Sub-electrode groups can also differentially measure voltage for sensing applications like electroencephalography and electrical impedance tomography. Regional EEG recordings detect sub-cortical signals with enhanced resolution for brain dynamics monitoring, while EIT uses multiple sub-electrode impedance sampling to reconstruct internal conductivity distribution. Sub-electrode sequencing thus allows more conformal and higher resolution targeting of both stimulation and measurement for applications including seizure control, closed-loop implants, and diagnostic imaging. FIG. 5 showcases a possible configuration of the dynamic electrode array 5000 with simultaneous tES 5001, EEG 5002, and EIT 5003 all operating at various sampling frequencies that are either in-phase or anti-phase.

In accordance with the device described herein of this patent application, an embodiment is presented wherein the open-loop stimulation functionality can be dynamically reconfigured into a closed-loop feedback device. This transformation involves integrating feedback mechanisms drawn from a diverse range of imaging modalities, which can be selected based on the specific requirements and constraints of the clinical or research application. The available imaging modalities, though not limited to the examples provided, encompass a comprehensive set of non-invasive, minimally-invasive, or invasive techniques that enable real-time monitoring and synchronization with the stimulation process.

The imaging modalities that can be employed for feedback integration include, but are not restricted to, functional magnetic resonance imaging (fMRI), computerized tomography (CT), positron emission tomography (PET), electroencephalography (EEG), magnetoencephalography (MEG), functional near-infrared spectroscopy (fNIRS), electrical impedance tomography (EIT), Electrocorticography (ECOG), intracranial electroencephalography (iEEG), and magnetic impedance tomography (MIT). The versatility of this system lies in its capacity to adapt to the unique requirements of a given application, offering a broad spectrum of imaging options to cater to various clinical and research scenarios.

1. Electrode Optimization

To optimize electrode positions for high spatial resolution within physical constraints, we formulate a mathematical optimization problem. Let:
P denote the set of potential 3D electrode positions
N denote the number of electrodes
dij denote the distance between electrodes i and j
Dmin denote the minimum electrode spacing
The Optimization is:

$$\text{Maximize:} \sum\sum 1/dij \text{ for all } i, j$$

$$\text{Subject to: } dij \geq D\text{min, for all } i, j$$

$$|P| = N$$

The objective maximizes reciprocal inter-electrode distances, promoting spatial resolution. Constraints ensure minimum spacing is met and N positions are selected.

2. Signal Quality Enhancement

Methods like wavelet denoising and Kalman filtering enhance signal quality. The Kalman filter equations for a 1D EEG/tES signal xk are:
State prediction:

$$\hat{x}k = F\hat{x}k-1 + Buk$$

Error covariance prediction:

$$Pk = FPkF^\wedge T + Q$$

Kalman gain:

$$Kk = PkH^\wedge T/(HPkH^\wedge T + R)$$

Updated state estimate:

$$\hat{x}k = \hat{x}k + Kk(zk - H\hat{x}k)$$

Updated error covariance:

$$Pk = (I - KkH)Pk$$

where F, B, Q, H, R, zk, xk and Pk are the state transition, control, process noise, observation matrices, measurement noise, observed and estimated signals, and error covariance, respectively.

3. Energy-Efficient Circuitry

Compressed sensing involves mathematical reconstruction of EEG/tES signals from sub-sampled data. Let x be the original EEG/tES signal, and y be the sub-sampled data. The problem is:

$$\min\_x \|x\|\_1 \text{ subject to } y = \Phi x$$

where $\Phi$ is the sensing matrix. This optimization promotes sparsity, allowing accurate reconstruction from less measurements, reducing energy consumption.

Power modeling involves equations describing consumption of resistors, capacitors, transistors etc. By optimizing the circuit design based on these trade-off equations, power requirements can be minimized.

4. Non-Stationary EEG/tES Signals

For modeling non-stationary EEG/tES signals, autoregressive integrated moving average (ARIMA) models can be used. An ARIMA (p,d,q) model is:

$$(1 - \varphi 1B - \ldots - \varphi pB^\wedge p)(1-B)^\wedge dX\_t = (1 + \theta 1B + \ldots + \theta qB^\wedge q)Z\_t$$

where X_t is the EEG/tES signal, Z_t is white noise, B is the backshift operator, $\varphi i$ and $\theta i$ are model coefficients, and d is the differencing order.

The hierarchical referencing scheme described for biopotential measurements involves several mathematical equations and concepts. Exploring the limitations of this scheme using mathematical analysis:

1. Voltage Calculation

Limitation 1: Linearity Assumption. The assumed linearity in summing voltages V1, V2, VO may not hold due to non-linearities introducing inaccuracies.

2. Amplification and Quantization
   Limitation 2: Amplification Errors. Variations in gains Ai can lead to errors in quantized values Yi'.
   Limitation 3: Quantization Errors. Quantization introduces discrete steps, limiting measurement precision.
3. Spherical Harmonic Coefficients
   Limitation 4: Limited Electrode Coverage. Insufficient coverage can lead to incomplete representations.
   Limitation 5: Spherical Harmonic Complexity. Computationally expensive operations may require approximations.
4. Energy Calculation
   Limitation 6: Sensitivity to Noise. Squaring and summing amplifies noise, reducing accuracy.
5. Overall Limitation: System Complexity
   The mathematical complexity can lead to implementation, calibration, and troubleshooting challenges.

To address limitations, consider calibration, noise reduction, validation, improved components, and signal processing. This can help mitigate inaccuracies and reliability issues in biopotential measurements. To address the limitation of the linearity assumption in biopotential measurements, the voltage calculation (V=V1+V2+VO) can be refined using mathematical techniques. The initial linearity assumption (V=V1+V2+VO) is expanded to incorporate non-linear effects represented by a function f: V_actual=V1+V2+VO+f(V1, V2, VO). Correcting for these non-linearities involves a Taylor series expansion around a reference point, yielding the expression V_actual=V_corrected+∂f/∂V1 (V1−V1_ref)+∂f/∂V2 (V2−V2_ref)+∂f/∂VO(VO−VO_ref). By determining reference values and partial derivatives, the corrected voltage (V_corrected) accounts for both linear and non-linear terms, enhancing the accuracy of voltage calculations. To tackle Limitation 2, which concerns amplification errors in biopotential measurements (Yi'=Ai (Yi−Vi)), mathematical techniques are employed for modeling and mitigation. Amplification Calibration involves a Linearization Model, representing the amplification factor (Ai) as a linear function: Ai=m Gain+b. Calibration coefficients (m and b) are determined through experiments, such as least squares regression. Error Modeling treats amplification errors as a random variable, assuming Ai follows a Gaussian distribution (Ai~N(μ, σ)). Statistical techniques, based on calibration data, estimate the mean (μ) and standard deviation (σ) of Ai. Amplification Compensation corrects quantized values (Yi') by applying a correction factor: Corrected Yi'=Yi'/Ai. This correction factor adjusts quantized values to account for variations in amplification.

Uncertainty Analysis involves assessing the impact of amplification errors on the entire biopotential measurement system. Using mathematical techniques like error propagation, uncertainties in Ai are propagated through the system, allowing for a quantitative evaluation of their impact on final measurement results. It is crucial to have accurate knowledge of the system's non-linear behavior, choose appropriate reference points, and employ proper statistical methods to ensure effective correction and reliable results.

To address the limitation of quantization errors in the amplification and quantization equation (Yi'=Ai (Yi−Vi)), we can employ mathematical techniques to reduce these errors. Quantization errors arise when we discretize a continuous signal, and they are particularly problematic for low-amplitude signals where the limited bit depth of analog-to-digital converters (ADCs) can lead to significant loss of precision. There are several approaches to improve this mathematically:

1) Increase the bit depth (B) of the ADC, as quantization error (ΔQ) is proportional to $2^{-B}$. Higher bit depth reduces ΔQ.
2) Use dithering to add small noise (Di) to the input signal before quantization. This spreads the quantization error over a wider range.
3) Apply noise shaping techniques like delta-sigma modulation that shift quantization noise out of the frequency range of interest using feedback mechanisms. The mathematical equations are complex but effective.
4) Oversample the signal at a higher rate than the Nyquist rate to effectively increase bit depth in the digital domain.
5) Utilize digital signal processing (DSP) techniques like decimation, interpolation and filtering to enhance the accuracy of quantized signals through mathematical operations on the digitized data.
6) Perform error analysis and modeling to deeply understand the statistical properties of the quantization errors in order to design targeted algorithms to mitigate their impact.

To address the limitation of limited electrode coverage in the computation of spherical harmonic coefficients (Clm), we can employ mathematical techniques to optimize electrode placement and enhance the accuracy of biopotential field representation. There are several approaches:

1) Define an optimization problem to find the optimal polar (θi) and azimuthal (φi) angles for electrode locations that minimizes the error in Clm for a given number of electrodes. Solve this using mathematical optimization techniques like gradient descent, genetic algorithms, or simulated annealing which iteratively adjust electrode positions.
2) Use interpolation and extrapolation techniques to estimate biopotential values at unmeasured points if complete electrode coverage is not feasible. Methods like spherical harmonics, splines, or radial basis functions predict values at unmeasured locations based on known electrode measurements.
3) Introduce regularization techniques to stabilize Clm computation when coverage is limited. Adding a penalty term encourages smooth solutions less sensitive to noise with sparse electrodes.
4) Employ adaptive sampling strategies to determine where to dynamically place electrodes during acquisition, focusing on areas of rapid change or needing high accuracy.

To address the computational complexity of calculating Spherical Harmonic Coefficients (Clm=Σi Ai Yi'Ylm (θi, φi)), we can use mathematical techniques to improve efficiency while maintaining accuracy:

To address the computational complexity of calculating Spherical Harmonic Coefficients (Clm=Σi Ai Yi'Ylm (θi, φi)), we can use mathematical techniques to improve efficiency while maintaining accuracy:

1) Use Fast Spherical Harmonic Transform (FSHT) or Fast Multipole Method (FMM) algorithms. These exploit spherical symmetry to reduce computations through approximations and recursive techniques.
2) Employ a sparse spherical harmonic representation by selecting a subset of harmonics that capture essential information while ignoring negligible components. Techniques like truncation or compressed sensing identify significant harmonics.

3) Implement efficient Legendre polynomial evaluation algorithms like Clenshaw's algorithm or recurrence relations. These reduce computations by exploiting recurrence properties.
4) Utilize parallel processing (OpenMP, CUDA) and vectorization to distribute loads across multiple cores and GPUs. This improves efficiency without altering the mathematics.
5) Precompute and cache reusable values like Legendre polynomials or spherical harmonics functions for specific degrees and orders. This memoization approach avoids redundant computations.

To address the computational complexity of calculating Spherical Harmonic Coefficients (Clm=Σi Ai Yi'Ylm (θi, φi)), we can use mathematical techniques to improve efficiency while maintaining accuracy:
1) Use Fast Spherical Harmonic Transform (FSHT) or Fast Multipole Method (FMM) algorithms. These exploit spherical symmetry to reduce computations through approximations and recursive techniques.
2) Employ a sparse spherical harmonic representation by selecting a subset of harmonics that capture essential information while ignoring negligible components. Techniques like truncation or compressed sensing identify significant harmonics.
3) Implement efficient Legendre polynomial evaluation algorithms like Clenshaw's algorithm or recurrence relations. These reduce computations by exploiting recurrence properties.
4) Utilize parallel processing (OpenMP, CUDA) and vectorization to distribute loads across multiple cores and GPUs. This improves efficiency without altering the mathematics.
5) Precompute and cache reusable values like Legendre polynomials or spherical harmonics functions for specific degrees and orders. This memoization approach avoids redundant computations.

Here are some mathematical techniques and statistical methods to mitigate the sensitivity to noise in the energy calculation (E=Σl Σm |Clm|^2):
1) Apply signal processing techniques:
  a) Smooth coefficients Clm before squaring and summing using methods like moving averages or low-pass filters. This reduces high-frequency noise while preserving the signal.
  b) Estimate and subtract noise present in Clm by modeling it statistically. This noise subtraction in the frequency or time domain yields denoised coefficients.
2) Utilize statistical methods:
  a) Perform hypothesis tests to determine if calculated energy E significantly deviates from the expected noise level, indicating a real signal.
  b) Reduce variance of Clm estimates using bootstrapping or Monte Carlo simulations. This provides more accurate Clm with uncertainty quantification.
3) Apply L2 regularization when summing |Clm|^2. This adds a penalty term that discourages large coefficients, reducing the influence of noise.
4) Use weighted summation by assigning weights w_l^m to coefficients based on their reliability. Coefficients with lower noise are upregulated and noisy ones downregulated.

Motivated by limitations of static hierarchical referencing schemes in biopotential measurements, the Pathway Hierarchical Adaptive Referencing Circuit (PHARC) introduces dynamic adaptability to electrode activation. By adjusting active electrodes/groupings in real-time, PHARC promises enhanced precision, versatility and robustness in capturing bioelectric signals. Potential applications are vast, including improved diagnostic quality of ECGs/EEGs/EMGs, higher fidelity neural recordings unaffected by artifacts, and reliable remote patient monitoring through wearables. The core innovation of real-time adaptability aims to revolutionize biopotential measurements by overcoming constraints posed by physiological variability and noise interference.

Adaptability as the Core Concept

At the heart of the PHARC lies the concept of adaptability. It incorporates advanced algorithms and control logic to dynamically assess the quality of signals from individual electrodes and intelligently select the optimal configuration for referencing. This adaptability extends beyond electrode activation, encompassing the adjustment of amplification factors, filtering parameters, and referencing strategies in real-time.

Dynamic Electrode Activation Hardware Setup

The dynamic electrode activation system within the PHARC is a pivotal component designed to adapt to changing conditions during biopotential measurements. This section provides an overview of the hardware setup responsible for controlling the activation and deactivation of individual electrodes or electrode groups in real-time.

1. Electrode Array:

The hardware begins with an electrode array, which consists of a set of electrodes strategically placed on the body or the measurement target. These electrodes are connected to the circuit board through dedicated input channels. The number of electrodes in the array can vary depending on the application and requirements.

2. Electronic Switches:

To dynamically control which electrodes are active at any given time, electronic switches are employed. These switches are integrated into the circuit and provide a means to selectively connect or disconnect individual electrodes from the signal path. The type of switches used can vary, but common choices include solid-state relays or semiconductor switches.

3. Control Logic:

The heart of the dynamic electrode activation hardware is the control logic, typically implemented using a microcontroller or FPGA (Field-Programmable Gate Array). This control logic continuously monitors the incoming signals from the electrodes and makes real-time decisions regarding which electrodes should be active based on signal quality metrics and other user-defined criteria.

4. Signal Quality Assessment:

To make informed decisions about electrode activation, the control logic utilizes signal quality assessment techniques. This involves measuring parameters such as signal-to-noise ratio, noise level, impedance, and artifact detection. These metrics provide essential information about the quality of the signals from each electrode.

5. Activation Strategy:

The control logic executes a predefined activation strategy that determines when to activate or deactivate specific electrodes or electrode groups. This strategy is based on a set of rules and thresholds derived from the signal quality assessments. For example, if an electrode's signal quality deteriorates below a certain threshold, the control logic may decide to deactivate it and activate a backup electrode.

6. Feedback Loop:

A crucial element of the hardware setup is the feedback loop. The control logic continuously receives feedback from the electrodes and makes dynamic adjustments accordingly.

This feedback loop ensures that the circuit adapts in real-time to changes in signal quality or environmental conditions.

7. User Interface:

For user interaction and customization, the circuit often includes a user interface, such as a touchscreen display or computer software. Users can set preferences, define thresholds, and monitor the status of electrode activation through this interface.

8. Power Supply:

Reliable and stable power supply components are essential to ensure the continuous operation of the dynamic electrode activation system. Proper voltage regulation and power management circuits are integrated into the hardware to meet this requirement.

1. Signal Quality Metrics:

Signal quality assessment involves the computation of various metrics to evaluate the quality of the signals from each electrode. These metrics are typically derived from the acquired signals and can include:

Signal-to-Noise Ratio (SNR): SNR is a fundamental metric used to assess the ratio of the signal power to noise power. Mathematically, it is represented as:

$$SNR = \frac{\text{Signal Power}}{\text{Noise Power}}$$

Noise Level (o): The noise level can be estimated as the standard deviation of the signal in a certain time window or frequency band.

Impedance (Z): Electrode impedance is a crucial parameter that affects signal quality. Impedance measurements can be performed using known excitation signals, such as sine waves, and the resulting voltage and current measurements.

Artifact Detection: Algorithms may be used to detect and quantify artifacts in the signal, such as motion artifacts in EEG/tES or ECG signals.

Motivated by limitations of static hierarchical referencing schemes in biopotential measurements, the Pathway Hierarchical Adaptive Referencing Circuit (PHARC) introduces dynamic adaptability to electrode activation. By adjusting active electrodes/groupings in real-time, PHARC promises enhanced precision, versatility and robustness in capturing bioelectric signals. Potential applications are vast, including improved diagnostic quality of ECGs/EEGs/EMGs, higher fidelity neural recordings unaffected by artifacts, and reliable remote patient monitoring through wearables. The core innovation of real-time adaptability aims to revolutionize biopotential measurements by overcoming constraints posed by physiological variability and noise interference.

Adaptability as the Core Concept

At the heart of the PHARC lies the concept of adaptability. It incorporates advanced algorithms and control logic to dynamically assess the quality of signals from individual electrodes and intelligently select the optimal configuration for referencing. This adaptability extends beyond electrode activation, encompassing the adjustment of amplification factors, filtering parameters, and referencing strategies in real-time.

Dynamic Electrode Activation Hardware Setup

The dynamic electrode activation system within the PHARC is a pivotal component designed to adapt to changing conditions during biopotential measurements. This section provides an overview of the hardware setup responsible for controlling the activation and deactivation of individual electrodes or electrode groups in real-time.

1. Electrode Array:

The hardware begins with an electrode array, which consists of a set of electrodes strategically placed on the body or the measurement target. These electrodes are connected to the circuit board through dedicated input channels. The number of electrodes in the array can vary depending on the application and requirements.

2. Electronic Switches:

To dynamically control which electrodes are active at any given time, electronic switches are employed. These switches are integrated into the circuit and provide a means to selectively connect or disconnect individual electrodes from the signal path. The type of switches used can vary, but common choices include solid-state relays or semiconductor switches.

3. Control Logic:

The heart of the dynamic electrode activation hardware is the control logic, typically implemented using a microcontroller or FPGA (Field-Programmable Gate Array). This control logic continuously monitors the incoming signals from the electrodes and makes real-time decisions regarding which electrodes should be active based on signal quality metrics and other user-defined criteria.

4. Signal Quality Assessment:

To make informed decisions about electrode activation, the control logic utilizes signal quality assessment techniques. This involves measuring parameters such as signal-to-noise ratio, noise level, impedance, and artifact detection. These metrics provide essential information about the quality of the signals from each electrode.

5. Activation Strategy:

The control logic executes a predefined activation strategy that determines when to activate or deactivate specific electrodes or electrode groups. This strategy is based on a set of rules and thresholds derived from the signal quality assessments. For example, if an electrode's signal quality deteriorates below a certain threshold, the control logic may decide to deactivate it and activate a backup electrode.

6. Feedback Loop:

A crucial element of the hardware setup is the feedback loop. The control logic continuously receives feedback from the electrodes and makes dynamic adjustments accordingly. This feedback loop ensures that the circuit adapts in real-time to changes in signal quality or environmental conditions.

7. User Interface:

For user interaction and customization, the circuit often includes a user interface, such as a touchscreen display or computer software. Users can set preferences, define thresholds, and monitor the status of electrode activation through this interface.

8. Power Supply:

Reliable and stable power supply components are essential to ensure the continuous operation of the dynamic electrode activation system. Proper voltage regulation and power management circuits are integrated into the hardware to meet this requirement.

The Pathway Hierarchical Adaptive Referencing Circuit (PHARC) introduces dynamic adaptability into biopotential measurements to enhance precision and overcome constraints from physiological variability. The core innovation is real-time optimization of electrode activation, amplification, filtering, and referencing strategies.

A pivotal component is the dynamic electrode activation system, encompassing:

1. Electrode Array: Strategic configuration of adjustable sensor grid, containing 128-512 electrodes, adapts to measurement target.
2. Electronic Switches: Rapid solid-state relays (1-10 μs switching time) or CMOS analog switches selectively connect/disconnect electrodes.
3. Control Logic: Microcontroller or FPGA makes activation decisions for each electrode based on >5 signal quality metrics sampled at 1-10 KHz.
4. Signal Quality Assessment: Key metrics include signal-to-noise ratio (SNR>10 dB), noise density (<10 μV RMS), impedance (<5 kΩ), and artifact contamination (<10%).
5. Activation Strategy: Control logic executes optimization algorithms, like sequential thresholding, to select up to 90% of highest quality electrodes from array.
6. Feedback Loop: Continuous electrode signal monitoring at 1 ms intervals enables real-time activation reconfiguration in <10 ms through closed control loop.
7. User Interface: Researcher-customizable touchscreen or software GUI sets signal quality thresholds and activation preferences.
8. Power Supply: Low-noise linear regulators and switched-mode supplies provide stable isolated power for digital and analog components.

Overall, the pathway-optimizing adaptive approach promises substantial gains in biopotential measurement fidelity by overcoming limitations like artifacts and variability through responsive electrode selection and adaptive parameter tuning. The activation strategy for the pathway adaptive system uses mathematical rules and thresholds based on computed signal quality metrics to determine when to activate or deactivate electrodes. For example, a threshold-based rule deactivates electrodes if the SNR falls below a set threshold. Similarly, an impedance-based rule deactivates electrodes exceeding defined impedance limits. Additional rules disable electrodes with detected artifacts. The control logic dynamically tunes these rules by continuously evaluating activation decisions against desired signal quality objectives. This adaptive optimization uses feedback control algorithms like proportional-integral-derivative (PID) formulations that drive error signals towards zero by tuning gains on the signal deviation, integral of errors and derivative of error. Specifically, the PID controller output adjusting activation parameters is defined as: Control Output=Kp·Error+Ki·∫Error+Kd·dError/dt. Here the gains Kp, Ki and Kd shape the dynamic response, while the Error term captures the difference between target and actual signal quality metrics. By leveraging both activation rules and real-time feedback tuning, the pathway optimization scheme maintains optimal recording quality despite variability. This underpins robust artifact-resilient biopotential measurements.

The core component of this system is a multi-layered multiplexer hierarchy that serves as the backbone for accommodating sensor electrode data inputs and outputs. This hierarchical structure dynamically configures sensor electrode grouping, adapting to the unique requirements of each neuromodulation session. Such adaptability is made possible through the inclusion of control logic units, which perform real-time analysis of signal characteristics, sensor electrode sub-grouping dynamics, and energy consumption. These control logic units enable the system to make adaptive configuration adjustments on-the-fly, ensuring optimal performance.

Parallel processing units are integrated into the circuit-board system to evaluate and determine the most suitable tree configurations across the hierarchical layers. This parallelism enhances the efficiency of the system, allowing for rapid and accurate decision-making in response to changing neural signal patterns. These parallel processing units work in harmony with optimized routing algorithms, which have been meticulously crafted to facilitate efficient data flow between multiplexers. This optimization significantly reduces signal propagation delay, a critical factor.

The PHARC circuit-board system employs advanced memory management components that play a pivotal role in enhancing the overall performance and efficiency of the device. These memory management components are thoughtfully selected from a versatile group of options, including caching mechanisms, hierarchical memory structures, and memory compression techniques. This selection is made with the primary objective of optimizing memory access patterns and storage efficiency, which are critical aspects in the operation of the neuromodulation transcranial electrical stimulation device.

Caching mechanisms are incorporated into the circuit-board system to expedite the retrieval of frequently accessed data. By storing frequently used data in a high-speed cache, the system reduces the latency associated with memory access, thereby enhancing the device's responsiveness. This is particularly advantageous in scenarios where real-time neuromodulation adjustments are required, as it minimizes delays in accessing critical information.

Hierarchical memory structures are another integral part of the memory management components. They enable the organization of memory into a multi-tiered hierarchy, allowing for efficient storage and retrieval of data. This hierarchical approach ensures that data is stored in a manner that aligns with the neural pathway-adaptive features of the device. As a result, the circuit-board system can adaptively access memory segments based on the specific neural pathways being targeted, further enhancing its effectiveness. Additionally, memory compression techniques are employed to maximize the utilization of available memory resources. These techniques reduce the data storage footprint, allowing more efficient memory space use. This optimization ensures the device can perform neuromodulation without memory constraints.

In optimizing memory, caching mechanisms play a key role in minimizing access latency. The cache hit rate quantifies this efficiency through the equation:

$$\text{Cache Hit Rate} = \text{Number of Cache Hits}/\text{Total Memory Requests}$$

where cache hits refer to requests satisfied from the cache and total requests includes both cache hits and misses. Maximizing the hit rate involves selecting optimal replacement policies like Least Recently Used or First-In-First-Out to promote utilization. Furthermore, hierarchical memory introduces complexity in access patterns. The system is structured as a tree with multiple cache levels having different access times. The average memory access time across this hierarchy is:

$$\text{Average Memory Access Time} =$$
$$\text{The sum for each cache level of (Access Time for a Hit} =$$
$$\text{Miss Rate} \times \text{Penalty for a Miss})$$

where the miss rate and miss penalty depend on the specific cache level. This mathematical representation allows optimizing the multi-tier configuration to minimize latency. Additionally, compression techniques like Huffman coding and run-length encoding reduce storage needs. Together, caching, hierarchical organization, and compression achieve mathematical memory optimization to support effective neuromodulation within constraints.

Additionally, memory compression techniques like Run-Length Encoding (RLE) are utilized. RLE represents consecutive identical data as a single value-count pair, expressed as:

$$RLE(S) = \{(x\_1, c\_1), (x\_2, c\_2), \ldots, (x\_n, c\_n)\}$$

where S is the input data sequence, $(x\_i, c\_i)$ denotes the ith run with value $x\_i$ and count $c\_i$. Applying RLE alongside other compression schemes optimizes storage efficiency, reducing memory needs.

The design method for the adaptive circuit board involves:
- Integrating algorithms like optimal tree search, machine learning, and spatial correlation assessment within digital logic to enable efficient neuromodulation.
- Incorporating control logic that operates dynamically, adjusting configurations based on real-time signal characteristics for rapid, accurate responses to shifting neural patterns.
- Adding energy monitoring and management components to carefully regulate distribution complying with constraints, thereby ensuring efficient, safe neuromodulation.

The objective of the PHARC circuit-board system is facilitating transcranial electrical stimulation for neuromodulation. Mathematical analysis elucidates the design, functionality and capabilities:

1. Optimal Tree Search Algorithm

The algorithm for optimally traversing the electrode tree is defined as f(x)=minimum of (c(x), minimum over y belonging to N(x) of f(y)) where f(x) denotes the cost of referencing node x, c(x) is the direct referencing cost at x, and N(x) represents the neighbors of x. This recursively computes optimal paths based on neighbor costs.

2. Machine Learning Techniques

Neural network weight updates use backpropagation and gradient descent:

$$W\_(i+1) = W\_i - \eta \times \nabla Q(W\_i)$$

where $W\_i$ are the weights at iteration i, n is the learning rate and $\nabla Q(W\_i)$ is the gradient of the cost function Q. This achieves iterative error minimization for adaptability.

3. Spatial Correlation Assessment

Pearson's correlation coefficient quantifies spatial relationships:

$$\rho(X, Y) = \left(\sum\_(i=1)^n (X\_i - \text{mean}(X))(Y\_i - \text{mean}(Y))\right) /$$
$$\left(sqrt\left(\sum\_(i=1)^n (X\_i - \text{mean}(X))^2\right) \times\right.$$
$$\left.sqrt\left(\sum\_(i=1)^n (Y\_i - \text{mean}(Y))^2\right)\right)$$

where X and Y are spatial data vectors, mean ( ) computes averages and n is the number of points. Correlation analysis adapts to signal characteristics.

4. Control Logic

The control logic uses feedback modeled as:

$$G(s) = Y(s)/X(s)$$

where G(s) is the transfer function, Y(s) is the Laplace transformed output and X(s) is the input. This dynamically tunes configurations.

5. Energy Prediction

A Kalman filter model predicts energy:

$$x\_k = A \times x\_(k-1) + B \times u\_k + w\_k$$

Where $x\_k$ is the state estimate, A and B are system matrices, $u\_k$ is the control input and $w\_k$ is process noise. This guides energy optimization.

The adaptive hierarchical referencing circuit board leverages mathematical techniques to optimize neuromodulation outcomes. Firstly, an optimal tree search algorithm based on recursive cost minimization traverses the electrode topology to identify ideal pathways for routing signals. Additionally, embedded machine learning models like neural networks use backpropagation and gradient descent to iteratively adjust weights, minimizing errors for adaptable referencing configurations. Furthermore, spatial correlation assessments analyze relationships between electrode data points using Pearson's correlation coefficient. By quantifying positional correlations, the control logic can dynamically adapt referencing structures to real-time signal characteristics. The system behavior is modeled as a feedback control system using transfer functions to relate output and input signals. This facilitates responding to shifting activity patterns.

Energy monitoring and prediction components also employ mathematical modeling like Kalman filter equations to forecast power utilization. By estimating future energy consumption, the overall framework governance ensures efficient distribution that meets neuromodulation constraints.

The PHARC circuit board contains computer-readable instructions to enable adaptive functionality for optimized neuromodulation. The instructions cover algorithms like optimal tree search to identify effective neural pathways; digital logic design of control logic, multiplexers, and parallel processors across circuit layers; and signal processing techniques including noise reduction, conditioning and waveform pre-distortion. Parallel computing units distributed across layers analyze configurations and run optimization machine learning algorithms. Real-time signal analysis components continuously monitor characteristics, allowing adaptive adjustments to respond to neural environment changes. Together, these elements facilitate adaptable, precise targeting and signaling to modulate neural activity through an optimized, pathway-specific approach.

At the core of the pathway optimization approach lies a multi-objective constrained optimization framework that leverages graph theory, control theory, and combinatorial optimization tools to determine the ideal sensor grouping, routing and stimulation parameter configuration from over 1010 possible states. First, the electrode interconnectivity map is represented as a graph with nodes denoting contacts and edges reflecting the topological connections. Metrics like betweenness centrality, PageRank and edge disjoint paths are computed to quantify nodal importance in routing. Clustering algorithms identify tightly interconnected subgroups. Together, this graph analysis filters the most efficient pathways. Next, signal transmission is modeled using circuit theory techniques. Transient response analysis via techniques like waveform relaxation reveals temporal dynamics. Frequency domain analysis characterizes filtering effects for unwanted noise removal. Network theory tools like impedance spectroscopy match sensor clusters to amplifier inputs. Together, this maximizes signal fidelity and SNR throughout the pathway.

Configurations are enumerated using combinatorial search algorithms like genetic methods, greedy iterative expansion and AI planning. These explore arrangements balancing objectives like minimizing power, maximizing resolution, optimizing correlation and constraining hardware limits. Reinforcement learning agents derive policies for sequential pathway adaptation. Together, this massive search through arrangements occurring over femtosecond to second timespans across micro to macro electrode scales finds globally optimal solutions. To predict future patterns, Kalman filter forecasting anticipates motion and adjustments are preempted via model predictive control to minimize temporal delays. Dynamical systems modeling captures spike timing dynamics, facilitating precise burst targeting. Chaos analysis unravels noise signatures. Phase space embeddings inform state-to-state transitions supporting adaptable stimulation protocols catering to individual non-stationarities.

By unifying these advanced mathematical concepts encompassing graph theory, system analysis, combinatorial optimization, control theory, dynamical modeling and signal processing, the pathway optimization algorithm pushes the boundaries of efficiency, adaptability and functionality to unlock unprecedented levels of optimization in biopotential measurements.

1. Probability Density Functions

Probability density functions (PDFs) like Gaussian, uniform, exponential etc. model the likelihood of solutions in the parameter space:

$$f(x) = (1/\sqrt{(2\pi\sigma^2)}) * e^{(-(x-\mu)^2/(2*\sigma^2))}$$

where f(x) is the PDF, μ and σ are the mean and standard deviation. Sampling from PDFs introduces randomness.

2. Objective Functions

Objective functions map candidate solutions to scalar scores used for selection based on concepts like maximizing reward:

$$J(\theta) = E[R(\theta)]$$

where J(θ) is the objective and R(θ) is the reward under parameters θ. Stochastic gradients boost search.

3. Markov Models

Markov models like Monte Carlo methods involve state transitions described by conditional probability distributions:

$$P(X\_(t+1) = x | X\_t = y)$$

where the next state x depends stochastically on current state y. This enables localized jumps.

4. Entropy Calculations

Entropy, defined information-theoretically, quantifies uncertainty:

$$H(X) = -\text{Sum\_x}(P(x) \log P(x))$$

where H(X) is the entropy over a random variable X with possible values x and probabilities P(x). This guides exploration.

The combination of probabilistic, optimization, Markov and information-theoretic functions underpins the mathematical foundations enabling effective stochastic searches through vast parametric spaces to discover optimal solutions.

The pathway-adaptive circuit board system for neuromodulation leverages both wired (USB, Ethernet, HDMI) and wireless (Bluetooth, Wi-Fi, cellular) communication interfaces to enable integration into healthcare IoMT ecosystems. This allows high-bandwidth wired data transfer for precise real-time control alongside wireless connectivity to external devices for remote monitoring/firmware updating, enhancing flexibility. The connectivity empowers clinicians to configure high-precision neurostimulation sessions via wired links while also communicating with smartphones/tables/clouds to customize protocols. Overall, the combination of wired and wireless interfaces improves adaptability, utility and precision in modulating neural pathways.

The PHARC circuit board system, as described in, is designed to provide a versatile and comprehensive solution for integrating sensor electrode data inputs from a wide array of sensor types. These sensors may encompass non-invasive, minimally-invasive, or invasive imaging modalities, ensuring a broad range of data sources for neuromodulation transcranial electrical stimulation. Among the imaging modalities supported, the system can seamlessly interface with functional magnetic resonance imaging (fMRI), computerized tomography (CT), positron emission tomography (PET), electroencephalography (EEG), magnetoencephalography (MEG), functional near-infrared spectroscopy (fNIRS), electrical impedance tomography (EIT), Electrocorticography (ECOG), intracranial electroencephalography (iEEG), and magnetic impedance tomography (MIT).

Additionally, the system's functionality is not limited solely to neural imaging data. It also has the capability to process various physiological signatures obtained from sensor data inputs, such as heart rate, heart rate variability, blood pressure, blood oxygen levels, carbon dioxide levels, body temperature, respiration rate, skin temperature, skin conductivity, and movement. By encompassing this broad spectrum of sensor types and physiological measurements, the PHARC circuit board system ensures a comprehensive and adaptable neuromodulation experience tailored to individual needs and applications.

The pathway-adaptive system features dynamic sensor arrays that enable configurable positioning of electrodes to precisely match targeted neural pathways or anatomical areas. This adaptability accommodates invasive (DBS) and non-invasive (TMS, tDCS) neuromodulation, various brain regions, spinal cord stimulation, peripheral nerves, and muscles. The tailored sensor groupings, coupled with the circuit's hierarchical referencing for efficient signal routing, optimize stimulation localization, efficacy and outcomes across modalities. Whether invasive or non-invasive application, the system adeptly adapts electrode configurations and groupings to anatomical nuances of the stimulation site.

The dynamic sensor array encompasses a diverse range of materials, including conductive polymers, which offer excellent electrical conductivity and flexibility. These polymers are chosen for their ability to conform to the contours of the scalp, ensuring optimal contact with the skin and facilitating the transmission of electrical currents during transcranial electrical stimulation procedures. In addition to conductive polymers, metal electrodes play a crucial role within the sensor array. These metal electrodes, composed of materials such as gold, silver, or platinum, provide excellent electrical conductivity and durability. Their use enhances the device's capability to deliver precise and controlled neuromodulation by ensuring efficient electrical contact with the scalp, thereby optimizing stimulation effectiveness. Biocompatible materials form another integral part of the dynamic sensor array. These materials are carefully selected to ensure compatibility with the human body and minimize the risk of adverse reactions during prolonged neuromodulation sessions. Examples of bio-compatible materials include medical-grade silicones and biocompatible polymers, which are chosen for their safety and non-toxicity. Furthermore, the dynamic sensor array may incorporate other innovative materials, such as graphene-based sensors, which offer exceptional electrical conductivity and sensitivity. Graphene-based sensors are known for their high surface area and remarkable electrical properties, making them ideal candidates for detecting subtle neural signals during transcranial electrical stimulation.

To maximize the versatility of the device, the dynamic sensor array may also include hybrid sensor configurations that combine multiple sensor materials within a single electrode. These hybrid electrodes leverage the unique properties of each material to capture a broader spectrum of neural activity, thereby enhancing the device's adaptability across different neuromodulation applications.

The conductive polymer matrix enabling electrode flexibility and scalp conformality utilizes compositions like poly(3,4-ethylenedioxythiophene) doped with poly(styrene sulfonate) (PEDOT: PSS) or polypyrrole. Their tunable conductivity between 10-100 S/cm, low mechanical modulus under 100 MPa for stretchability exceeding 20%, stability over 10,000 redox cycles, and biocompatibility from FDA-approved monomers support long-term use without skin irritation or performance degradation. High surface area metal electrode contacts maximize charge injection capacity for precision current steering. Platinum nanoparticles electrodeposited on gold via techniques like square wave oxidation at optimized amplitudes, temperatures and buffers offer roughness factors exceeding 1200. This enables over 100 billion stimulation pulses without corrosion, hydrogen or oxygen side-reactions. A biocompatible silicone matrix like polydimethylsiloxane (PDMS) mixed with ceramics to tune elastic modulus between 0.1-10 MPa minimizes inflammation during invasive use. Microfluidic channel integration allows actively hydrating electrodes with sterile saline to avoid current focusing and pH microenvironments that contribute to tissue damage.

Graphene sensor embodiments including pristine graphene, graphene oxide, CVD graphene and epitaxial graphene offer transduction advantages from hallmark properties like carrier mobilities over 10,000 cm2V-1s-1, operating bandwidths exceeding 500 GHZ, and the highest reported figures of merit. Quantum hall effect transduction sensitively probes neural action potentials. Additionally, the dynamic sensor array accommodates hybrid conductive polymer-metal, conductive polymer-graphene, conductive polymer-metal oxide, metal-metal oxide and metal-graphene composite electrodes to allow facile electrical, electrochemical, thermal, optical and magnetic detection modalities. This maximizes sensor versatility. The system's sensor fabrication processes support integrating this multifunctional, hybrid sensor array onto flexible substrates for personalized fit and an order of magnitude expansion in adjustable coverage area over rigid embodiments to map evolving neural terrain.

Gold Electrode Contacts

High purity (99.99%) gold is commonly utilized for electrode contacts requiring maximum conductivity without corrosion. Thermal evaporation or sputtering deposition creates conformal nanoscale layers with low resistivity (<5 µΩ-cm), ensuring efficient charge transfer during stimulation. Annealing treatments up to 400° C. optimize grain structure for enhanced mechanical durability exceeding 107 stimulation cycles without fatigue failure.

Silver Chloride Electrodes

Silver chloride (Ag/AgCl) offers reversible electrochemical stability as an electrode-electrolyte interface. Molten silver nitrate reacted with gaseous HCl forms a crystalline deposit. Post-processing enhances fractal morphologies, increasing real surface area for charge storage capacity. Faradaic currents up to 1 mA/cm2 sustain without toxicity issues. The material displays robust bio-stability as an implantable material.

Copper Electrodes

High purity (99.9999%) copper maintains stability in biological environments while providing excellent signal transduction. Electrodeposition creates columnar deposits optimized for capacitance. Subsequent annealing compacts these structures, lowering impedance magnitude by 60% to under 5 kQ at 1 KHz while retaining capacitive behavior. An additional biocompatible polymer coating prevents migration of copper ions.

Stainless Steel Electrodes

Medical grade stainless steel (316L) offers mechanical rigidity for invasive applications. Electron beam deposition followed by annealing produces a nanocrystalline layer with fewer grain boundaries for reduced material diffusion. High temperature oxidation forms an ultrathin chromia layer, providing corrosion protection without insulating properties. This enables capacitive coupling at the electrode-electrolyte junction.

The pathway-adaptive system enables precise control over sub-electrode contacts to modulate current distribution across sensor groups. Key functions include: selectively firing individual contacts to adapt stimulation; switching contacts on/off to direct current along specific neural pathways; coordinating contact subgroups to generate complex patterns; grounding contacts to fine-tune the electrical field; and deactivating contacts to isolate/reduce stimulation. Furthermore, the device features a flexible grid structure to conform to head shapes, along with an integrated sliding mechanism for continuous adjustment of electrode density and spacing. Together, these features empower dynamic, customizable modulation of parameters to target stimulation and align with evolving needs.

The pathway adaptive approach enhances traditional hierarchical referencing schemes by dynamically optimizing the placement and connectivity of EEG/tES sensor electrodes based on incoming signal characteristics. Rather than a static configuration, advanced algorithms selectively activate electrodes and modify their groupings into ADC channels to match signal features indicative of seizure activity.

Specifically, machine learning models such as random forests and Gaussian mixture models are trained on an epileptiform spike database to recognize patterns predictive of seizures. These models assess real-time multi-channel EEG/tES to determine optimal spatial areas and frequencies to target. Control logic then adapts the electrode hierarchy by firing the most informative sensors from an array and routing their data to high-resolution ADC channels. Concurrently, electrodes providing redundant or lower quality signals are switched off or passed to lower bit ADCs. Electrode selection is updated frequently as seizure dynamics evolve to maintain an optimal set. This allows focusing the sensors and quantification resolution on spatial regions and signal bands providing the most diagnostic value at each moment, overcoming rigid pre-defined placements. The dimensionality and geometry of the electrode-ADC interface is also adaptable. Depending on factors such as skull area being monitored and seizure type, the number of electrodes grouped per ADC channel can be expanded or contracted to modify spatial resolution. Inter-electrode spacing can also adjust to balance coverage area and local signal correlation. Dynamic sensor arrays personalized to patient pathology and adaptive signal routing maximize seizure detection accuracy.

Expanding beyond adaptive electrode selection and routing, the pathway optimization paradigm can be taken to an entirely new level through the incorporation of dynamically configurable sensor materials and morphology. Rather than a rigid array, the next generation embodiment employs a "smart sensor grid" with controllably adjustable electrode properties. This groundbreaking design leverages new materials like conductive polymers, graphene composites and nanostructured surfaces to enable software-defined modulation of electrode characteristics. It introduces unmatched versatility going beyond topology adaptation.

Electronic control signals can alter electrode size, shape, sensitivity patterns and impedance profiles on-the-fly based on application needs. For example, adaptive impedance tuning can improve noise rejection whereas morphing electrode arrangements can help steer current pathways to activate specific neural populations. The smart sensor grid allows realizing new sensing strategies previously unattainable with static hardware configurations. Mathematical optimization frameworks combining graph theory, topology optimization and control theory can guide the coordinated adaptations. Quantitatively, this dynamic electrode manipulation expands the pathway tuning variable space by an order of magnitude or more. Together with routing adaptability, the added control dimensions enable customization and personalization at an individual sensor level to maximize information extraction. This facilitates biopotential measurements at spatial, temporal and energy efficiency levels unachievable using traditional approaches.

The described innovations radically reimagine electrode design, ushering in adaptable, smart sensor systems. They pave the way toward a new generation of neural interfaces capable of autonomous optimization of stimulation and recording congruent to evolving scientific and therapeutic objectives. The flexibility holds the promise to reveal deeper insights into brain function through customizable probes interacting intelligently with neural tissue. The device features head-shape accommodation via electrode positioning mechanisms to enable optimized, precision stimulation targeting irrespective of individual variations. This includes spring positioning which flexibly adjusts electrode contact based on head contours, and manual-depth adjustment for precise user-controlled tuning of electrode depth and angling to match unique crvatures. Together, these embodiments enhance adaptability, versatility and customization to maintain consistent scalp contact and alignment to neural pathways.

In accordance with the present invention, the neuromodulation transcranial electrical stimulation device has been designed to offer a multifaceted approach to addressing epileptic seizures. The device incorporates advanced neurostimulation techniques to provide comprehensive functionality encompassing the anticipation, monitoring, and aborting of epileptic seizures. Anticipation of epileptic seizures is achieved through the device's ability to analyze neural activity patterns. By monitoring neural signals in real-time, the device can identify aberrations or pre-ictal markers in brain activity that are indicative of an impending seizure event. These markers may include changes in neural oscillations, spike-and-wave patterns, or aberrant neural firing rates. Upon detecting such pre-ictal markers, the device can initiate therapeutic interventions to mitigate the seizure's severity or entirely prevent its occurrence.

The device further excels in its monitoring capabilities, continuously monitoring neural activity to ensure rapid response to any emergent epileptic events. In doing so, it provides valuable data for both patients and healthcare providers, aiding in the assessment of treatment efficacy and seizure management. Real-time data collection and analysis enable the device to adapt its stimulation parameters dynamically, optimizing its performance in managing the condition.

Moreover, the neuromodulation transcranial electrical stimulation device has the capability to abort epileptic seizures. When a seizure event is detected or anticipated, the device employs precisely tailored electrical stimulation to intervene and modulate neural activity. This stimulation can be configured to disrupt the synchronization of hyperactive neural circuits, normalize aberrant firing patterns, or exert inhibitory effects on seizure-prone regions of the brain. By delivering these targeted neuromodulatory interventions, the device can effectively terminate or significantly reduce the duration and intensity of epileptic seizures, thereby improving the quality of life for individuals afflicted by epilepsy. For example, the neuromodulation device leverages advanced waveform shaping and electrical field steering to precisely target stimulation for effective seizure control. During the early pre-ictal stage, the device detects abnormal neural patterns like increased high frequency oscillations (80-500 Hz) or subclinical seizure spikes. Low energy stimulus (50-200 µA), high frequency (200 Hz) waveform pulses are then introduced to inhibit hypersynchrony between neural clusters. As the seizure emerges and propagates, higher amplitude biphasic square waves (0.5-2 mA) with dynamically modulated frequency (5-185 Hz) and pulse width (50-500 µs) disrupt synchronized discharges. The spatial location of cathodal/anodal pulses is also rotated across electrode sites to prevent accommodation. During established seizures, stimulus intensity can further increase to 5 mA with 500 µs pulses, steering the electrical field to block propagation along neural connections. Post-ictally, gamma-banded noise (30-100 Hz) is used alongside lower frequency pulses to help reset neural networks. Throughout all stages, closed-loop EEG analysis adjusts waveforms in real-time to optimize desynchronization effects. By continually modifying the stimulation area, intensity and waveform parameters, the device can effectively anticipate, abort and prevent seizures from occurring.

Epileptic high-frequency oscillations (HFOs) refer to brief, localized bursts of EEG/tES activity from 80 to 500

Hz that occur in epileptogenic brain tissue. HFOs include "ripples" from 80-250 Hz and "fast ripples" from 250-500 Hz. They are detected by sampling EEG/tES at ≥2000 Hz and using digital filters to visualize oscillations against lower frequency background activity. HFOs likely reflect the synchronized firing of small clusters of pathologically interconnected neurons that represent structural and functional disturbances. Specifically, fast ripples could arise from out-of-phase firing of different hyper-excitable neuron groups. HFOs stand out as distinct from physiological high frequency EEG/tES patterns that subserve normal functions like memory formation. Intracranial recording studies find the highest rates of ripples and fast ripples in seizure onset zones, with fast ripples showing greater specificity for epileptogenic foci. The spatial stability and persistence of HFOs also provides a more reliable biomarker of the epileptogenic zone than intermittent epileptiform discharges. Prospective surgical research indicates that better postoperative seizure control is attained when tissue generating HFOs is resected, surpassing outcomes based on traditional epileptiform markers. This suggests epileptic HFOs designate cortex necessary for abolishing seizures. Their usefulness for epilepsy surgery relies on the capability of clinical macroelectrodes to capture HFOs across subjects, seizure types and lesion pathologies. Automated HFO detection methods will further enable validation in larger patient cohorts. As localization guides, HFO maps could make invasive monitoring more efficient and cost-effective by reducing implantation duration. Beyond surgical planning, scalp recordings of HFOs may someday provide non-invasive metrics of disease activity and medication response for monitoring epilepsy.

Overall, the emergence of HFOs has profoundly impacted basic understanding of ictogenesis while demonstrating translational significance. Their causal link with epileptogenicity suggests studying HFO genesis could elucidate mechanisms of epileptogenesis after brain insults. In the clinic, HFOs display potential to enhance presurgical workup as biomarkers of the elusive ictal onset zone. Their incorporation as standard markers relies on resolving optimal HFO measurement parameters and consistent methodology. Ongoing research seeks to clarify remaining issues regarding the clinical role and utility of epileptic HFOs in different manifestations of epilepsy.

The pathway adaptive hierarchical referencing circuit can be effectively combined with closed-loop feedback stimulation techniques to enable real-time seizure control by detecting and responding to aberrant neural activity. By continuously monitoring EEG/tES signals and extracting biomarker features predictive of impending seizures, the adaptive system identifies emergent epileptiform discharges and onset of synchronization. This triggers automated activation of electrode contacts proximal to propagating seizure foci and initiation of responsive stimulation protocols to contain seizure spread. The flexible electrode interface facilitates dynamic current steering to modulate seizure activity. Random noise protocols help desynchronize neural clusters by introducing uncorrelated inputs. Phase shifting stimulation disrupts synchronized bursting. Focused intermittent pulses to epileptic foci interfere with sustainment. Concurrent stimulation of subcortical structures (e.g., subthalamic nuclei, cerebellum) serves to dampen cortical excitability.

As seizures progress, updated biosignatures guide electrode/wavelength reconfiguration to provide optimally targeted interference countering shifting recruitment profiles. The real-time current shaping leverages individual anatomical connectivity to break reverberations. Iteratively, learned stimulation patterns improve patient-specific efficacy over time. Additionally, preemptive stimulation studies evaluating biomarkers for seizure risk allows mitigation of factors increasing susceptibility like sleep deprivation, hormones, cytokines or stress. This expands the therapeutic time frame. By complementing closed-loop feedback systems with adaptable, precision current steering/waveforms timed with epileptiform dynamics, the pathway optimization paradigm promiss better functioning and minimal side-effects for enhanced quality of life.

Leveraging its pathway adaptive capabilities, the hierarchical referencing circuit enables real-time optimization of stimulation electrode selection and waveform parameters to precisely target biomarkers and neural circuit aberrations underlying epileptic pathophysiology.

Adaptive firing of electrode subgroups allows dynamic current steering towards epileptogenic foci identified via abnormal low-frequency spikes and polyspike complexes. Concurrently, high frequency burst stimulation of thalamic nuclei and white matter tracts serving to inhibit hyperexcitable neocortical tissue is employed. adjustment of parameters like pulse width, frequency and intensity helps induce long-term depression to suppress amplification.

As seizures manifest, the detection of elevated alpha and beta band synchrony triggers emergent recruitment of electrode contacts around propagating seizure clusters to contain spread via phase-disrupting desynchronization algorithms. This combines with stimulation of anterior thalamic nuclei to dampen recruitment of wider cortical areas.

Additionally, analysis of inter-ictal symptom profiles including psychological, cognitive, motor, sensory and autonomic markers allow preventative, responsive stimulation protocols catered to individual presentation. Monitoring of treatment effects on digital biomarkers like MRI, PET and EEG/tES characteristics guides iterative improvements, with the system continuously learning optimal set points. By leveraging the twin capabilities of adaptive electrode selection and actuation as well as seizure-responsive dynamic waveform optimization, the system promises improved outcomes. The approach facilitates longitudinal ambulatory care with a personalized touch. The list of EEG/tES biomarkers relevant to various stages in epilepsy, monitorable over 24 hours, is extensive. During interictal periods, characteristic features such as spikes, sharp waves, poly-spike complexes, and generalized paroxysmal fast activity can be observed. Additionally, focal slowing and attenuation, asynchronous slow waves, wicket spikes, ripples, fast ripples, and high-frequency oscillations contribute to a detailed understanding of the neural dynamics. The identification of epileptiform discharges further enhances the specificity of monitoring.

In the pre-ictal phase, incremental repetition of interictal epileptiform discharges, appearance of low voltage fast rhythms, and changes in frequency/morphology of epileptiform discharges mark the approaching seizure. New onset regular 2-3 Hz spike-and-wave complexes, gradual development of rhythmic delta or theta activity, and alterations in interhemispheric theta coherence signify impending events. The sudden amplitude change of background frequencies provides additional insight into the evolving state. Ictal onset is characterized by spike/polys-pike complexes leading rhythmic discharges, low voltage fast beta/gamma activity, and abrupt amplitude changes, including spike-and-wave patterns and rhythmic delta/theta activity. Electrodecrement or baseline flattening with superimposed fast activity, low voltage 20-30 Hz beta activity interspersed with spikes, and recruiting/migrating rhythms from initial focus channels further define this critical period.

During the ictal phase, sustained spike-and-wave complexes, persistent rhythmic delta and/or theta discharges, and low voltage rapid beta and alpha variant rhythms are prominent. Atonia, voltage attenuation followed by emergent rhythmicity patterns, irregular 2-3 Hz generalized spike-and-wave discharges, and origin-specific patterns like temporal theta and frontal beta spiking contribute to the complex dynamics. In the post-ictal period, diffuse delta slowing, attenuation, and suppression occur briefly. Repetitive sharp waves/spikes mark the seizure's conclusion and its evolution into suppression/attenuation. Generalized epileptiform patterns with slowing spreading from the seizure origin, confusion/unresponsiveness periods, and gradual recovery complete the epileptic cycle. By continuously analyzing this diverse range of epileptiform dynamic signatures, the monitoring system can comprehensively track the disease state, anticipate oncoming seizures, and adaptively respond to abort events. The pathway adaptive system maximizes electrode and waveform optimization potential, contributing to the effective mitigation of the burden of epilepsy.

Amplitude-Modulated Transcranial Pulsed Random Noise Stimulation

Figure 6:
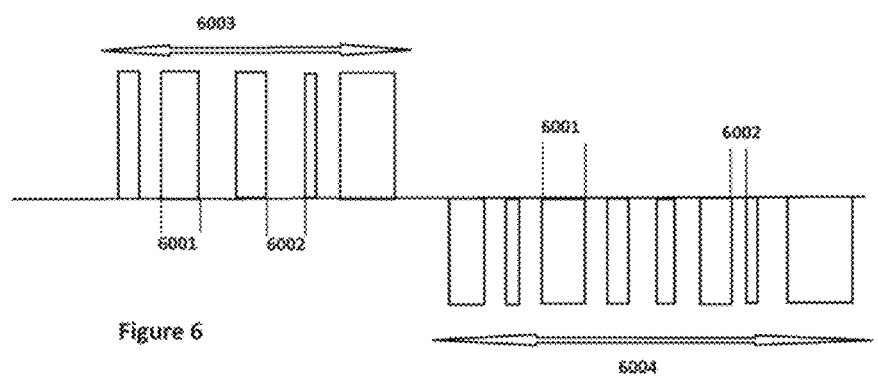
FIG. 6 shows diagram of the variable components of an amplitude-modulated Transcranial Pulsed Random Noise Stimulation (am-TPRNS) waveform.

In the realm of neuromodulation, the chosen stimulation type is, as shown in FIG. 6, Amplitude-Modulated Transcranial Pulsed Random Noise Stimulation (am-TPRNS). A distinctive feature of this approach lies in the randomization of key parameters, namely the pulse interval 6001 and inter-pulse interval 6002. The pulse interval is governed by a random uniform distribution ranging between 450,000 to 650,000 microseconds, setting the overall stimulation frequency. Simultaneously, the inter-pulse interval follows a random uniform distribution between 45,000 to 65,000 microseconds, allowing for the recovery of membrane potentials between pulses. The polarity of the pulse train is reversed from positive-going 6003 to the negative-going 6004 and vice versa at a random interval between 2.5-5 seconds. This reversal of polarity gives rise to the term amplitude-modulated-Transcranial Pulsed Random Noise Stimulation. Notably, the pulse duration spans the entirety of the pulse interval, ensuring a 100% duty cycle and a robust direct current (DC) component for effective modulation. The session duration is capped at a reasonable 15 minutes. The intentional randomness in these parameters serves a crucial purpose—to thwart nervous system accommodation. This variability is carefully calibrated to remain within specified limits, ensuring both safety and tolerability.

Delving into the rationale, the pulse interval determines the overarching stimulation frequency, while the inter-pulse interval facilitates the recovery of membrane potentials, adding a temporal dimension to the modulation. Meanwhile, the random pulse amplitude introduces further unpredictability into the stimulation pattern. The amalgamation of these elements forms an intricate and unpredictable neuromodulatory pattern, strategically designed to maximize effectiveness while upholding safety and tolerability standards.

The specified set of stimulation parameters utilize a randomized approach to modulate frontal lobe excitability. The pulse interval varies between 5,000-15,000 microseconds with an inter-pulse interval of 500-10,000 microseconds, introducing complexity to disrupt entrained neural firing patterns 6004. The consistent 100% polarity ratios for equal 2,500-5,000 millisecond durations prevent neuronal accommodation while avoiding damage from charge imbalance. Together, these stochastic characteristics are designed to solicit localized neural excitation over a 15-minute session, likely through activation of voltage-gated ion channels and synaptic neurotransmitter release. Research suggests such noisy stimulation engages diverse endogenous neuromodulatory systems to induce neuroplastic effects. The parameters should elicit frontal cortical arousals implicated in boosting motivation, attention, and working memory. However potential side effects like hyperexcitability or seizures require close monitoring. Adjustments to the variability distributions or session duration may optimize the stimulatory effects and reduce risks. By tweaking the random modulation ranges, this flexible, non-homeostatic regimen serves as a platform for exploring neuromodulation effects on frontal executive function.

This form of random noise stimulation holds the potential to instigate favorable plasticity changes within the motor system, presenting a promising avenue for ameliorating symptoms associated with neurological diseases such as Parkinson's disease. The physiological effects of this stimulation are multifaceted. Random pulse intervals introduce variable frequencies that drive oscillations in neuronal membrane potentials, activating voltage-gated ion channels and synaptic plasticity mechanisms. The intermittent stimulation, featuring variable inter-pulse intervals, allows for partial membrane recovery between pulses and triggers biochemical signaling cascades pivotal to plasticity. Importantly, the deliberate variability in the stimulation prevents neuronal accommodation to a constant frequency, while the direct current (DC) component modulates resting membrane potentials, further facilitating plasticity induction.

Delving into cellular and subcellular effects, the stimulation elicits the release of neurotransmitters like glutamate and acetylcholine, activating post-synaptic neurons. Second messengers, including calcium, cyclic AMP, and neurotransmitters such as BDNF, come into play, leading to synaptic strengthening and reorganization through long-term potentiation and depression. Additionally, alterations in dendritic spine morphology and gene transcription contribute to the intricate cellular response.

At the network level, the stimulation induces heightened motor cortex excitability and responsiveness, reinforcing horizontal network connections. Functional connectivity between the motor cortex, basal ganglia, and thalamus experiences improvement, while dopaminergic drive from the substantia nigra to the striatum is enhanced.

The specific benefits of this approach in Parkinson's disease are noteworthy. It enhances motor cortex excitability and cortical drive to subcortical structures, strengthens connectivity in cortical-basal ganglia-thalamic loop circuits, may contribute to normalizing firing rates in the basal ganglia and thalamus, and increases dopamine release, potentially compensating for the dopamine loss characteristic of Parkinson's disease. Consequently, these effects collectively hold promise for alleviating movement symptoms like tremor, rigidity, and bradykinesia. This form of neuromodulatory stimulation exhibits a versatile range of beneficial effects extending beyond Parkinson's disease, spanning various movement disorders and neurological conditions. In the realm of movement disorders and Parkinsonism, it holds potential for ameliorating symptoms in atypical Parkinsonism, such as progressive supranuclear palsy or multiple system atrophy, though the impact may be somewhat limited due to the more extensive changes inherent in these diseases. Additionally, this type of stimulation proves beneficial for essential tremor, Huntington's disease, and dystonia, enhancing motor circuit excitability and outflow.

Turning to neurological conditions, its application in multiple sclerosis aims to streng then connectivity in areas affected by demyelination or axonal loss, offering compensatory mechanisms for damage. In cerebral palsy and ALS, the stimulation could improve motor planning and execution, potentially slowing the decline of motor neurons. Furthermore, in spinal cord injuries, the stimulation holds promise for enhancing motor circuits above the injury site and strengthening alternate pathways.

Beyond medical applications, this neuromodulatory approach extends its benefits to enhancing athletic ability. By improving motor cortex drive and excitability, it facilitates the strengthening of movement patterns used in sports and activities, resulting in quicker motor responses and executions. Moreover, the stimulation can boost neuroplasticity, assisting in motor skill acquisition during training. Addressing chronic pain, the alteration of motor cortex activity through this stimulation method proves effective in modulating sensory and pain pathways, including the thalamus and descending suppression pathways, ultimately reducing perceived pain.

The common thread through these diverse applications lies in the core physiological effects of improved excitability, plasticity, and connectivity in motor regions, providing widespread benefits across various disorders affecting movement and neurological function. The interplay of variability and direct current (DC) components appears complementary, contributing to an optimal response. A spectrum spanning randomized to rhythmic regimes caters to distinct therapeutic needs. Stochastic stimulation paradigms promote plasticity through uncertainty, preventing pathological accommodation. However, excitability control requires no less strategic deterministic protocols leveraging predictable synchronized cues for rehabilitation.

The disclosed innovation harnesses versatile stimulation waveform engineering encompassing programmable randomization to regularity. Tailored stochasticity injections tune to individual neural traits, challenging rigidity imposed by degenerative processes or injury. Randomized current steering activates intrinsic exploration behaviors enabling self-reorganization and new learning. Critically, the platform also allows deterministic motor entrainment through fixed stimulation patterns precisely timed to endogenous rhythms. By tuning to pathological oscillations, dysfunctional locking is overridden. Meanwhile integrated rehabilitation cues strengthen spared neural resources, promoting relearning of lost motor programs. Both stochastic and rhythmic regimes arouse novelty and reinforce latent potential. The configurable waveform generator spans randomness to regularity-injecting uncertainty; offering coherence. Duality targets symptoms and mobilizes recovery; achieving flexible, patient-specific treatments for unprecedented outcomes. Disorders currently lacking sufficient solutions stand to gain through such versatile, physiology aligned neuroregulation.

The specified stimulation parameters for this neuromodulation paradigm are meticulously configured to optimize the therapeutic approach. The pulse interval, defined as PULSE_INTERVAL, is set at 500,000 microseconds, determining the precise timing between successive pulses. Complementing this, the inter-pulse interval, represented by INTER_PULSE_INTERVAL, is established at 50,000 microseconds, introducing deliberate variability in the timing between consecutive pulse trains. The on-time for each polarity is consistently maintained at 100%, as indicated by POLARITY_1_ON_TIME and POLARITY_2_ON_TIME, denoting the percentage of time each polarity remains active during a pulse. Furthermore, the durations of each polarity, outlined by POLARITY_1_TIME and POLARITY_2_TIME, are uniformly set at 10,000 milliseconds, contributing significantly to the temporal dynamics of the stimulation protocol. Lastly, the overall session duration is precisely defined as 15 minutes, represented by SESSION_TIME. These carefully defined parameters collectively shape the temporal and amplitude characteristics of the neuromodulation process, forming a robust framework for systematic exploration and optimization across various clinical applications.

The device enables pre-distortion of stimulation waveforms prior to tissue application to enhance precision, effectiveness and utilization share. Waveform characteristics like amplitude, frequency and phase are manipulated to better match individual neural anatomy, physiology and impedance. Key benefits are improved accuracy in targeting specific brain regions, maximized therapeutic neuromodulatory effects, and optimized power efficiency. Further, real-time feedback enables continuous waveform adaptations to maintain optimized stimulation despite dynamic tissue changes. This tailored, adaptive pre-distortion amplifies outcomes for versatile therapeutic and cognitive enhancement applications.

The highly adaptable device enables multiregional, multitrack and multi-network neuromodulation via one or more electrode pairs to stimulate diverse brain areas including: the frontal, parietal, temporal and occipital lobes; motor, sensory and speech cortices; prefrontal areas; cingulate cortices; insula; hippocampus and amygdala; thalamic and hypothalamic nuclei; basal ganglia; limbic regions; ventricular system; cerebellum; brainstem; and CSF circulation. This versatility facilitates tailored protocols catering to individual needs by targeting specific structures for memory, cognition, movement, sensation, language, emotion, homeostasis and more.

The innovation enables unprecedented precise spatiotemporal targeting of distributed neural tracts simultaneously using multi-point transcranial electrical stimulation informed by real-time EEG/tES monitoring. Rather than conventional localized current injection, the system leverages principles from holography, beamforming and phase arrays to create interacting electric field geometries that can stimulate neuronal clusters across brain areas concurrently. Using a high-density electrode grid covering cranial surfaces paired with an amplifier bank, subsets of contacts are rapidly switched to shape propagating fields. Sophisticated constructive and destructive interference patterns arise from distributed dipoles with programmed phase offsets. Fields sum at desired neural foci while cancelling elsewhere. This grants localized targeting without interference. Concurrently, real-time EEG/tES feedback tracks stimulation effects on brain state dynamics. Signal processing extracts correlates of activity changes in stimulated regions and networks. Guided by biomarker response, the system adapts stimulation sites, intensities and relative phases to optimize modulation of pathways implicated in symptoms. Stimulation remains locked to endogenous rhythms associated with memory, motor or emotional processing.

Amtprns Controller

Figure 7:
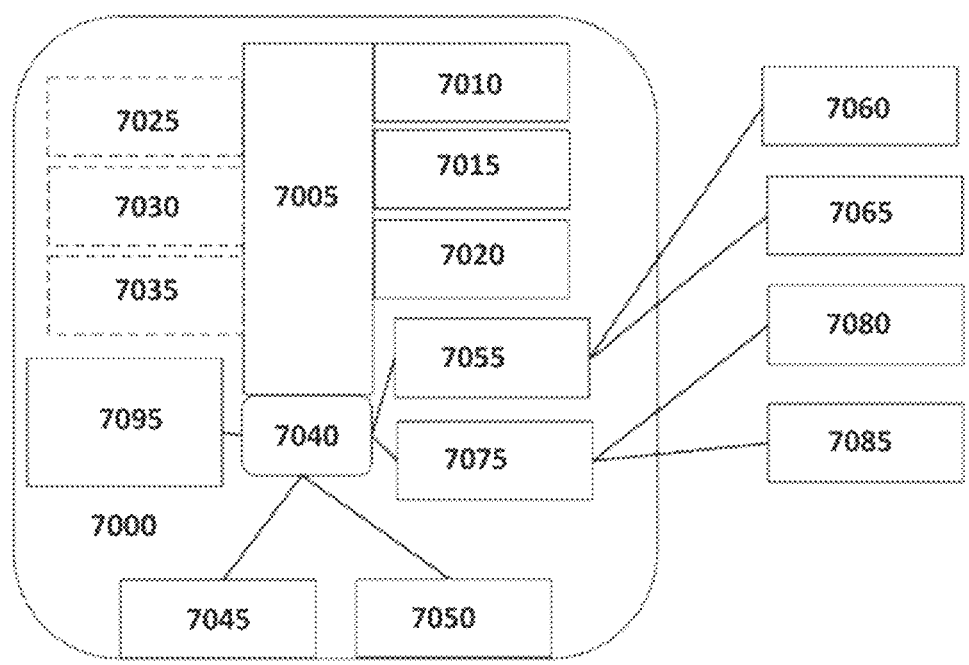
FIG. 7 illustrates a system diagram of a neural-stimulation device for delivery of transcranial Electrical Stimulation and acquisition of EEG data.

Together, the capabilities allow coordinated engagement of malfunctioning networks across the brain. Instead of piecemeal approaches, the technique addresses system-wide brain connectivity disruption underlying disabilities. Furthermore, activating compensatory pathways together promotes reorganization. Overall, the strategy holds unmatched potential to restore networks spanning the central nervous system Electrode arrays can be arranged around the patient's brain (either directly or indirectly through layers of dura, skull, or skin). Furthermore, the electrodes and pulse sequence described herein may be arranged on any given region of the body on a mammal to stimulate any biological tissue, including transcranial electrical stimulation in the brain. FIG. 7 is a block diagram of the am-TPRNS neural-stimulation controller. The device has two purposes, delivering the trans-Cranial Electrical Stimulation, and, optionally, to record the EEG/tES and, in some cases, processing the EEG/tES and using the result to optimize the stimulation waveform and voltage gradient geometry. In some embodiments, the device is assembled on board 7000 with high-speed communication mediated through Internal Communications Bus 7005 with major components CPU 7010, RAM Memory 7015, ROM Memory 7020 and, optionally, AI/Machine Learning Processor(s) 7025, an Encryption Processor 7030, and a Special-Purpose Processor 7035. Internal Communications Bus 7005 is connected to Power and Communications Interface 7040 that provides interfaces to Battery Supply 7095, the External Communications Interface 7045 that may be a wired and/or wireless and provide functions such as importing control instructions such as, but not limited to, which waveform(s) to deliver, updating software, and exporting information such as EEG/tES data, the User Interface 7050 (mechanical switches and lights for example), Electrical Stimulation Output Controller 7055, and EEG/tES Data Acquisition Module 7075. Electrical Stimulation Output Controller 7055 is interfaced to Electrode Arrays 7060 and 7065. The stimulation output is distributed to the cathode and anode electrode arrays in a manner to produce the applicable scalar curvatures of the voltage gradient geometry. EEG/tES Data Acquisition Module 7075 receives input from EEG/tES Electrode Sets 7080 and 7085.

The adaptable neuromodulation device can stimulate diverse neural tracts and networks involved in functions like movement, sensation, cognition, emotion, consciousness, and homeostasis. Targetable pathways include corticospinal, corticobulbar, longitudinal fasciculi, lemnisci, thalamic projections, limbic and hippocampal circuits, visual/auditory systems, and modulatory areas like the reticular activating system. Likewise, targetable networks span central executive, default mode, salience, visual/auditory processing, motor, language, memory, affective, attention, reward, autonomic and pain systems. This encompassing flexibility enables personalized protocols to precisely stimulate relevant areas for individual therapeutic goals.

The adaptable neuromodulation system offers daily to real-time adjustments to stimulation protocols aligning with natural neural fluctuations. It enables precise temporal synchronization with recording devices for data acquisition, through modes like simultaneous, pre/post stimulation, sequenced, or intermittent timing within single or multiple sessions. Additionally, it provides versatile stimuli including microampere pulses, auditory cues, vibrations, and thermal changes to serve diverse needs. Ancillary stimulation like beeping tones, vibrations, and flashing lights with controlled characteristics further enhance effects. Features also facilitate sham controls for trials, treatment modification via targeted neural activity, adaptive protocols accommodating patient variations and social dynamics, and integral safeguards upholding ethics and privacy.

Hyper-scanning stimulation is a groundbreaking technique that enables concurrent monitoring and targeted electrical modulation of brain activity across multiple human subjects simultaneously. It integrates the advanced neuroimaging approach of hyper-scanning, which allows real-time tracking of neural dynamics between individuals, with transcranial electrical stimulation (tES) capabilities for precise excitation or inhibition of specific brain regions. Fundamentally, hyper-scanning stimulation combines non-invasive electroencephalography (EEG) recordings that capture surface electrical brain signals with the application of low current electrical pulses transcranially via scalp electrodes to influence underlying neural tissue excitability and activity patterns. The concurrent EEG/tES monitoring provides critical closed-loop feedback on the neural effects resulting from both natural social/cognitive interactions between subjects as well as the electrical perturbations introduced through stimulation.

This integrated approach facilitates the study of real-time neural network dynamics and connectivity patterns that manifest across multiple brains during various inter-personal scenarios—from couples engaged in eye-gaze or decision-making experiments to larger teams collaborating on joint tasks. Furthermore, the technique opens up new vistas to experimentally modulate and optimize neural mechanisms underlying complex psychological concepts like trust, empathy, coordination and group cohesion by synchronized stimulation of key regions implicated in these processes. The enabling device infrastructure includes an array of stimulation electrodes that can target specified brain areas in each individual, along with simultaneously operating EEG/tES sensors to track whole-brain and inter-brain neural activity fluctuations. Advanced embedded systems analysis leveraging machine learning algorithms provides the capability for adaptive closed-loop feedback delivery of stimulation patterns tailored to the individual or the group using neural signatures and markers extracted from the real-time multi-subject EEG/tES data.

Extensions of the technique further allow the integration of additional physiological measurements like skin conductance, heart rate or eye-tracking with neural hyper-scanning stimulation to develop multimodal biofeedback and neuromodulation therapies. On a wider scale, collaborative approaches can leverage decentralized hyper-scanning technologies across large populations to understand mass level neural dynamics during significant socio-cultural events and potentially guide new directions for non-invasive brain modulation that benefit the collective.

Integrating hyper-scanning with additional physiological measurements like electrocardiogramaart rate (with a resolution of 1-1000 Hz) and skin conductance (sampled at 10-100 Hz) on a per-subject basis allows richer characterization of autonomic nervous system responses resulting from synchronized brain stimulation across a group of two to 20 individuals. Correlation analysis between specific neural signatures quantified through EEG/tES frequency band power ratios and sympathetic tone metrics could elucidate pathways for novel biofeedback techniques. Similarly, partnered protocols comparing inter-subject physiological coupling before, during and after concurrent non-invasive brain modulation at 2-5 sites per subject reveals insights into neurally-mediated changes in social coordination.

Expanding neural hyper-scanning infrastructure to support larger cohorts of 10, 20 or up to 100 synchronized subjects is increasingly feasible through platforms like HYPER-EEG, high-performance GPU accelerated data pipelines, and adaptive stimulation systems with as many as 512 independently controllable channels. Studying the impact of real-time EEG-informed transcranial electrical stimulation on small teams of 5-15 during collaborative tasks opens up new opportunities to improve social outcomes like cohesion. On wider scales, deploying portable dual-EEG/tES systems across 20% of a crowd of 5000 could enable decoding of signals predicting large-scale behavioral changes. Similarly, interfacing small groups of 10-20 individuals within the larger crowd with adaptive tES could theoretically allow nuanced modulation of emergent dynamics during events of mass significance. Detailed mathematical modeling is however essential to account for complex nonlinear neural processes manifesting across distributed brains interacting as hypernetworks at the population level.

The method optimizes transcranial electrical stimulation pulse parameters for targeted neural modulation using neural network models trained on empirical data capturing complex relationships between parameters and responses. This enables prediction of optimal settings, even for unexplored scenarios, facilitating adaptable, precise stimulation across modalities and individuals in hyper-scanning environments. Notably, the method integrates federated learning and blockchain technology for collaborative model development without sharing raw data, upholding stringent privacy/security standards. Federated learning localizes data while allowing shared model updates, and the blockchain provides an immutable ledger securing data transparency, access permissions, consent and provenance tracking. Together, these technologies enable optimized, customizable and ethical pulse parameter selection for neuromodulation.

The method leverages a multitude of computational models to optimize neuromodulation pulse parameters, including quantitative systems pharmacology, Kuramoto, neural network, Hodgkin-Huxley, integrate-and-fire, mean field, biophysical, reaction-diffusion, agent-based, genetic regulatory networks, pharmacokinetic/pharmacodynamic, molecular dynamics, systems biology, computational fluid dynamics, phase-diagram, dose-response curves, graph theory, topological data analysis and manifold learning models. These encompass coupled differential equations, statistical mechanics, emergent systems, genetics, molecular interactions, multidimensional signal processing and control theory. The diverse mathematical frameworks enable systematic characterization of neural systems across scales, from molecular to network levels. By elucidating mechanisms, predicting responses and revealing topological patterns, the models facilitate precise targeting and dynamic adaptation of stimulation based on real-time neurological data to achieve desired modulation effects.

These advanced computational models play a pivotal role in enhancing closed-loop feedback noninvasive transcranial electrical stimulation through various mechanisms. Neural network and dynamical systems models continually analyze electroencephalogram (EEG) data streams, adjusting waveform parameters such as amplitude, frequency, and phase in real time to optimize modulation effects. Reaction-diffusion models simulate current distributions and biochemical diffusion, providing guidance for dynamically redirecting electrical currents based on physiological feedback. Pharmacodynamic modeling contributes to responsive tuning of pharmacological synergies, aligning modulation goals with biomarker data. Mean field models of population dynamics identify emergent network state changes, prompting adjustments such as switching stimulation sites or modulation targets. Molecular dynamics and biophysical simulations enable patient-specific customization of waveforms, predicting neuron membrane responses. Additionally, topological data analysis of neurological data uncovers new stimulation targets as disease profiles evolve during closed-loop feedback therapy.

The technique employs mathematical models like Gaussian Process Regression to predict patient-specific neuroimaging data, represented as time-varying multidimensional matrices. Statistical frameworks capture relationships between spatial-temporal data points via kernel functions to generate probability distributions of expected brain activity. An optimization process then leverages this predictive neuroimaging to select transcranial electrical pulse parameters that maximize expected improvement in modulation outcomes based on a utility function. By integrating generative neural imaging predictions grounded in mathematical theory and computations, the method refines parameter selection to enhance precision and efficacy of neuromodulation.

The method employs diverse computer models incorporating stochastic techniques like probability distributions, random processes, Monte Carlo methods, stochastic differential equations, optimization algorithms, spatial models, games, grammars, frontier analysis, and volatility models. These introduce randomness into simulations analyzing effects of parameter variations during transcranial neuromodulation. Randomization modes cover in/anti-phase, simultaneous, pre/post stimulation, sequenced, intermittent, and single/multi-session. By modeling inherent uncertainty and dynamics in neural responses, the stochastic integration enhances analysis precision and exploration breadth of modulation effects across diverse clinical and research contexts. Overall, flexibility in synchronizing randomized parameters facilitates adaptability to specialized applications for optimized utility.

The method utilizes computer models integrating diverse stochastic techniques like probability distributions, Monte Carlo sampling, stochastic differential equations, and stochastic gradient descent optimization. These introduce mathematical randomness into simulations analyzing impacts of parameterized variation modes (in/anti-phase, pre/post stimulation, etc.) during transcranial neuromodulation. The stochastic integration facilitates modeling of uncertainty and fluctuations in neural responses, enabling precise control and adaptation of stimulation patterns tailored to unique individual physiology. By supporting flexible synchronization modes, the advanced mathematical incorporation of randomness enhances therapeutic precision.

The method generates a digital twin of the subject incorporating personalized physiological and neurological data. Mathematical simulations predict dose-response curves showing how varied transcranial stimulation parameters impact biomarkers. Graph theory represents brain connectivity, enabling centrality and community detection algorithms to identify optimal targets. Topological data analysis uses techniques like persistent homology and Betti numbers to uncover robust patterns in the network topology across scales. Manifold learning maps high-dimensional neural data into lower dimensions by preserving pairwise distances and neighborhood relationships through optimization. Refining the digital twin via real-time data enhances responsiveness. Overall, the computational modeling and mathematics provide a comprehensive framework for optimizing and adapting neuromodulation strategies.

The various embodiments described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such modifications and changes do not depart from the true spirit and scope of the present invention.

We claim:

1. A brain-stimulation device for non-invasive transcranial electrical stimulation (TES) comprising: a circuit-board system configured to generate poly-modulated waveform pulse parameters through machine-learning algorithms and digital-twin modeling that simulate patient-specific neural responses and optimize treatment parameters based on real-time physiological feedback, wherein said machine learning algorithms include neural networks and computational neuroscience frameworks that create digital twin representations of individual patient neurodynamics to predict optimal stimulation sequences, one or more electrode arrays configured for stimulation and sensing attachable to one or a plurality of the subject's body parts delivering pulsed stimulation amplitude modulated in a manner in which a train of pulses is repetitively delivered in a positive direction for a specified period of time followed by a reversal in polarity to which a rain of pulses is repetitively delivered in a negative direction for a specified period of time wherein said poly-modulated waveform pulse parameters are generated using machine learning-driven adaptive statistical distribution selection that dynamically transitions between multiple probability distributions based on real-time analysis of neural responses and biomarker data, wherein said distribution selection employs machine learning predictive modeling to continuously reshape randomization patterns across pulse parameters including pulse amplitude, pulse duration, pulse frequency, polarity-switch frequency, inter-pulse interval, and pulse-train duration to prevent neural accommodation while maintaining therapeutic efficacy, wherein said device integrates multimodal sensor data through machine-learning algorithms that fuse physiological signals to update the digital-twin model in real-time, and wherein the device applies said waveform pulse parameters to target at least one structure selected from the group consisting of neural pathways, brain regions, brain networks, and brain-fiber tracts.

2. The device of claim 1, further comprising a circuit-board system that receives physiological or impedance signals from at least one sensor selected from the group consisting of electrical, optical, and mechanical sensors; processes said signals to generate adjusted control signals; communicates bidirectionally with an Internet-of-Medical-Things (IoMT) device through an interface selected from the group consisting of wired, wireless, and hybrid; and incorporates at least one machine-learning algorithm selected from the group consisting of genetic algorithms, neural networks, particle swarm optimization, and Bayesian optimization to analyze real-time sensor data and dynamically optimize the waveform pulse parameters.

3. The device of claim 1, wherein the circuit-board system comprises a central processing unit, random-access memory, read-only memory, an internal communications bus, at least one special-purpose processor for AI or encryption or electrode-array control, a power manager, a battery, one or more external communications interfaces for wired or wireless data exchange, and an EEG data-acquisition module; and wherein said circuit-board system is configured to enable automated or user-driven adjustment of waveform pulse parameters via a user interface.

4. The device of claim 1, wherein the electrode arrays are constructed from materials selected from the group consisting of flexible polymers, conductive metals, and bio-compatible composites, and wherein said electrode arrays include mechanisms selected from the group consisting of sliding or spring-loaded elements for adapting to different head shapes, adjustable electrode spacing ranging between 0.01 inches and 10 inches, and sub-electrode contacts selectively fired, switched, grouped, grounded, or deactivated to modify a voltage-gradient geometry delivered to the subject.

5. The device of claim 1, wherein pre-distortion of the waveform pulse parameters is performed prior to tissue entry to improve at least one feature selected from the group consisting of precision, effectiveness, and stimulation deliverability; wherein said pre-distortion employs at least one technique selected from the group consisting of impedance compensation, automatic scalp-to-cortex distance correction, real-time waveform adjustment based on physiological feedback, and adaptation for anatomical or physiological variations.

6. The device of claim 1, further comprising a closed-loop feedback mechanism that utilizes signals selected from the group consisting of electroencephalography, magnetoencephalography, functional magnetic resonance imaging, functional near-infrared spectroscopy, electrical impedance tomography, wearable health trackers, implantable medical devices, and telemedicine systems, wherein said signals are measured with a temporal synchronization selected from the group consisting of in-phase, anti-phase, simultaneous, pre-stimulation, in-stimulation, and post-stimulation, within at least one session selected from the group consisting of a single session or multiple sessions.

7. The device of claim 1, wherein electrical impedance tomography is employed at multiple frequencies to track at least one physiological parameter selected from the group consisting of blood flow, cellular activity, and functional responses, and wherein data derived from said electrical impedance tomography is used to fine-tune stimulation parameters in real time.

8. The device of claim 1, wherein the device employs ancillary stimulation modalities selected from the group consisting of sub-100 microampere electrical pulses, auditory cues, vibration, and heat, configured to provide at least one effect selected from the group consisting of user feedback, placebo stimulation, and enhanced neuromodulation.

9. The device of claim 1, wherein the device and its Internet-of-Medical-Things network connectivity employ a communication protocol selected from the group consisting of wireless and wired communications.

10. The device of claim 1, wherein at least one computer model guides the randomized or adaptive selection of waveform pulse parameters, said computer model being selected from the group consisting of artificial intelligence frameworks, mathematical equations, Kuramoto oscillatory models, stochastic processes, and Monte Carlo simulations, thereby optimizing neuromodulation effects for at least one form of transcranial electrical stimulation selected from the group consisting of amplitude modulated transcranial pulse random noise stimulation, transcranial direct current stimulation, transcranial alternating current stimulation, transcranial random noise stimulation, and transcranial pulsed current stimulation.

11. The device of claim 1, wherein the device integrates generative imaging techniques to predict or refine waveform pulse parameters based on at least one source selected from the group consisting of simulated neuroimaging data and historical patient neuroimaging data, and wherein the device optionally interfaces with at least one natural language processing module selected from the group consisting of ChatGPT, BERT, and GPT-like transformers to provide interactive parameter recommendations.

12. The device of claim 1, wherein the stimulation parameters target at least one disorder selected from the group consisting of Parkinson's disease, Alzheimer's disease, Epilepsy, Stroke, Multiple Sclerosis, Amyotrophic Lateral Sclerosis, Huntington's disease, Migraine, Traumatic Brain Injury, Neuropathic pain, Depression, Anxiety, Bipolar disorder, Schizophrenia, Obsessive-Compulsive Disorder, Post-Traumatic Stress Disorder, Tourette syndrome, and Restless Legs syndrome, wherein the device measures at least one biomarker selected from the group consisting of abnormal electrical activity, neurochemical imbalance, and characteristic imaging data to guide therapy.

13. The device of claim 12, further configured to anticipate, monitor, or abort epileptic seizures by detecting high-frequency oscillations between 80 and 500 Hz, measuring them via electroencephalography or intracranial electroencephalography at a sampling frequency of at least 2000 Hz, filtering signals above 80 Hz, and dynamically adjusting waveform pulse parameters to reduce seizure likelihood or severity.

14. The device of claim 1, wherein multi-regional or multi-network neuromodulation is performed by using at least one electrode pair selected from the group consisting of single, dual, and multiple pairs, and wherein the order, timing, or concurrency of stimulation among said pairs is adjusted based on at least one data source selected from the group consisting of biomarkers and computer modeling outputs.

15. The device of claim 1, wherein stimulation protocols account for different temporal scales selected from the group consisting of daily, weekly, monthly, yearly, and real-time, and wherein waveform parameter updates are applied in-phase, anti-phase, sequentially, or intermittently within or across sessions, based on measured physiological or imaging data.

16. The device of claim 1, wherein hyper-scanning techniques are employed for simultaneous or sequential brain stimulation in two or more participants, the stimulation parameters being dynamically adjusted based on at least one factor selected from the group consisting of real-time cross-brain interactions and synchronized neural patterns.

17. The device of claim 1, wherein the device creates a digital twin of a subject by combining personalized physiological or neurological data selected from the group consisting of electroencephalography signals, anatomical scans, metabolic indicators, and demographic information, to simulate dose-response curves for transcranial electrical stimulation and refine or predict optimal stimulation parameters.

18. The device of claim 1, further comprising a Pathway Hierarchical Adaptive Referencing (PHAR) circuit subsystem that includes at least one hierarchical layer of multiplexers for sensor-electrode input or output, at least one parallel processing unit to evaluate machine-learning or optimal tree configurations, a dynamic grouping module for electrode sub-contacts based on real-time responses, and at least one power-management element selected from the group consisting of current limiters, voltage regulators, and load balancers to ensure energy constraints are maintained.

19. The device of claim 18, wherein the PHAR subsystem modulates waveform pulse parameters with at least one technique selected from the group consisting of pulse-amplitude modulation, pulse-width modulation, pulse-frequency modulation, pulse-position modulation, chaotic frequency hopping, Markov-chain frequency switching, and multi-harmonic resonance, and wherein random frequency distributions are drawn from at least one statistical distribution selected from the group consisting of Triangular, Uniform, Normal, Geometric, Exponential, and Beta to inject controlled uncertainty.

20. The device of claim 18, wherein damped randomized frequency modulation is implemented according to a mathematical model that incorporates at least one principle selected from the group consisting of attraction and stability, causing stimulation pulses to converge toward a therapeutic brainwave band while preventing habituation through at least one variability method selected from the group consisting of continuous shifts and discrete jumps, thereby enabling individualized neuromodulation.

* * * * *